United States Patent
Michimoto et al.

(10) Patent No.: US 7,856,629 B2
(45) Date of Patent: Dec. 21, 2010

(54) COMPILER APPARATUS

(75) Inventors: Shohei Michimoto, Osaka (JP); Taketo Heishi, Osaka (JP); Hajime Ogawa, Osaka (JP); Teruo Kawabata, Osaka (JP)

(73) Assignee: Panasonic Corporation, Osaka (JP)

( * ) Notice: Subject to any disclaimer, the term of this patent is extended or adjusted under 35 U.S.C. 154(b) by 1232 days.

(21) Appl. No.: 11/420,059

(22) Filed: May 24, 2006

(65) Prior Publication Data

US 2006/0277529 A1 Dec. 7, 2006

(30) Foreign Application Priority Data

Jun. 6, 2005 (JP) ............... 2005/165999

(51) Int. Cl.
*G06F 9/45* (2006.01)

(52) U.S. Cl. .............. 717/160; 717/151; 717/156; 717/161

(58) Field of Classification Search ............... None
See application file for complete search history.

(56) References Cited

U.S. PATENT DOCUMENTS

| | | | |
|---|---|---|---|
| 5,872,989 A | 2/1999 | Tsushima et al. | |
| 5,950,007 A * | 9/1999 | Nishiyama et al. | 717/161 |
| 6,016,399 A | 1/2000 | Chang | |
| 6,113,650 A * | 9/2000 | Sakai | 717/160 |
| 6,760,906 B1 * | 7/2004 | Odani et al. | 717/149 |
| 6,941,541 B2 * | 9/2005 | Snider | 716/18 |
| 7,010,787 B2 * | 3/2006 | Sakai | 717/159 |
| 7,523,448 B2 * | 4/2009 | Kawahito | 717/151 |
| 2002/0133813 A1 | 9/2002 | Ostanevich | |
| 2004/0163053 A1 * | 8/2004 | Snider | 716/3 |
| 2004/0194071 A1 * | 9/2004 | Tanaka | 717/136 |
| 2004/0268334 A1 | 12/2004 | Muthukumar et al. | |
| 2006/0107267 A1 | 5/2006 | Miyachi et al. | |

FOREIGN PATENT DOCUMENTS

JP 10-097423 4/1998

OTHER PUBLICATIONS

English language Abstract of JP 10-097423.

* cited by examiner

*Primary Examiner*—Tuan Q Dam
*Assistant Examiner*—Isaac T Tecklu
(74) *Attorney, Agent, or Firm*—Greenblum & Bernstein P.L.C.

(57) ABSTRACT

A compiler apparatus, which can perform software pipelining optimization that has a considerable effect of reducing the number of execution cycles taken to complete a loop process, converts a source program into a machine program for a processor which is capable of parallel processing. The compiler apparatus is composed of: a parsing unit operable to parse the source program and then to convert the source program into an intermediate program which is described in an intermediate language; an optimization unit operable to optimize the intermediate program; and a conversion unit operable to convert the optimized intermediate program into the machine language program, wherein the optimization unit is operable to execute software pipelining, by inserting a transfer instruction, which is used for transferring data between operands, into a loop process included in the intermediate program so that a data dependence relation is changed.

20 Claims, 20 Drawing Sheets

TRUE DEPENDENCE →
ANTIDEPENDENCE ⇢

→ TRUE DEPENDENCE
⇢ ANTIDEPENDENCE

LONGEST PATH 7
(e→f→g→e)

RESOURCE-CONSTRAINED
LONGEST PATH 10
(s→c→e→s)

2 CYCLIC PATHS
OF LENGTH 6
1 CYCLIC PATH
OF LENGTH 4
3 CYCLIC PATHS
OF LENGTH 3

3 CYCLIC PATHS
OF LENGTH 6
1 CYCLIC PATH
OF LENGTH 4
2 CYCLIC PATHS
OF LENGTH 3

⟶ TRUE DEPENDENCE
⇢ ANTIDEPENDENCE

COMPILER APPARATUS

BACKGROUND OF THE INVENTION (1) Field of the Invention

The present invention relates to a compiler apparatus which converts a source program described in a high-level language, such as the C language, into a machine language program. In particular, the present invention relates to speed enhancement achieved by the compiler apparatus for a loop process.

(2) Description of the Related Art

A compiler converts a source program described in a high-level language into a machine language program which is made up of machine language instructions. When doing so, the compiler sets the order of instructions so as to improve the execution efficiency of the machine language program. This operation is referred to as "instruction scheduling".

In the technical field of language processors, how to improve the execution efficiency of a loop process has been one of the research themes over a long period of time. Generally, a loop is made up of control statements, such as "for" statements and "while" statements, and a body including 0 or more arithmetic expressions. This body is repeated until a repetition condition defined by a control statement is satisfied. An executable unit for such a loop process is called "iteration", and the number of derived iterations is the same as the number of repetitions indicated in the control statement. For example, when the control statement describes that the body is to be repeated 100 times, 100 iterations would be derived from the body.

It should be understood that all or some of the iterations may be executed in parallel so that the execution efficiency of the loop process can be improved. For the parallel execution of the iterations, it is conventionally known that an optimization technique called "software pipelining" executed on the body of the loop process (also referred to as the "loop body" hereafter) is effective (see Japanese Application Publication No. 10-97423, for example).

Software pipelining is an optimization technique whereby the compiler converts the loop body into machine language instructions in a manner that parallels a pipeline so as to improve performance in the instruction execution. An explanation is given as to the execution of software pipelining, with reference to FIG. 1.

FIG. 1 (a) is a diagram showing an example of the loop body, which is made up of instructions A, B, and C, and a branch instruction br. FIG. 1 (b) is a diagram showing an example of a case where the instruction sequence shown in FIG. 1 (a) is iterated 3 times without the parallel execution. Suppose, for example, that each of the instructions A, B, and C and a branch instruction br takes 1 cycle to complete. In this case, 4 cycles are required to complete each repetitive process (i.e., iteration), meaning that 12 cycles are required to complete 3 iterations.

Meanwhile, FIG. 1 (c) is a diagram showing an example of a case where 3 iterations of the instruction sequence shown in FIG. 1 (a) are optimized by software pipelining so that the instruction sequences are executed in parallel. In this case, optimization is performed in such a manner that the instruction C and the instruction A are executed in parallel and that the branch instruction br and the instruction B are executed in parallel, respectively across 2 iterations. Accordingly, the same 3 iterations can be executed in a total of 8 cycles, which is reduced from 12 cycles having been taken without the parallel execution.

It should be noted here that a combination of instructions to be executed in parallel is determined in accordance with a dependence relation between the instructions as well as hardware resources available in the processor that executes the machine language program.

A period of time taken from the start of an iteration to the start of the next iteration is termed an "initiation interval". The shorter the initiation interval, the smaller the number of execution cycles required to complete the loop process and thus the faster the execution of the loop process.

However, in the case where considerable constraints are imposed on the hardware resources available to the processor, it is difficult to shorten the initiation interval or to appropriately perform instruction scheduling. This causes a problem that the effect of reducing the number of execution cycles would be small.

FIG. 2 is a diagram illustrating this problem. This diagram shows a result of optimization by software pipelining executed on the instruction sequence shown in FIG. 1 (a). Note here that each of the instructions A and B uses a hardware resource D. FIG. 2 (a) shows a result of optimization in the case where there is only one hardware resource D. Meanwhile, FIG. 2 (b) shows a result of optimization in the case where there are two hardware resources D. As shown in FIG. 2 (a), the instructions A and B cannot be executed in parallel because there is only one hardware resource D. On account of this, the initiation interval cannot be reduced below 2. On the other hand, as shown in FIG. 2 (b), the two hardware resources D allow the instructions A and B to be executed in parallel, thereby shortening the initiation interval to 1. In this way, the length of the initiation interval depends on the computer architecture. In other words, in the case where the initiation interval is long due to the hardware resource constraints, it is impossible to reduce the current initiation interval through optimization performed by the compiler.

Meanwhile, suppose that there is a loop-carried dependence, which refers to a data dependence between the instructions across the iterations. In this case, the minimum initiation interval is determined depending on the maximum number of cycles of the path including the loop-carried dependence in a data dependence graph that shows data dependence relations. This means that the initiation interval cannot be shortened to less than the value representing the present maximum number of cycles. For this reason, when this maximum value is large, there would be another problem that the software pipelining optimization has little effect of reducing the number of execution cycles.

FIGS. 3A and 3B are diagrams illustrating this problem. FIG. 3A is a diagram of a data dependence graph that shows data dependence relations among the instructions in the loop. FIG. 3B is a diagram showing a result of software pipelining executed on the basis of the data dependence graph shown in FIG. 3A.

Here, a brief explanation is given as to data dependences. Data dependences can be grouped under three classes, which are: "true dependence", "antidependence", and "output dependence". A "true dependence" refers to a dependence relation in which an instruction uses the variable having been defined by the preceding instruction. An "antidependence" refers to a dependence relation in which an instruction defines the variable having been used by the preceding instruction. An "output dependence" refers to a dependence relation in which an instruction redefines the variable having been defined by the preceding instruction. In addition to these, a data dependence that exists between iterations is particularly referred to as a "loop-carried dependence". This loop-carried dependence does not exist between the instructions of the body. To be more specific, a loop-carried dependence is a dependence relation that arises to allow a value obtained by an execution of an arithmetic expression within an iteration to be used in the iterations that follow. When this dependence relation exists, an arithmetic expression of the referencing side is prohibited from preceding an arithmetic expression of the defining side in execution. Moreover, in the present specification, a dependence relation that includes both a loop-carried dependence and one of the above-mentioned three dependences is referred to as follows. When a loop-carried dependence and a true dependence exist between two instructions, this relation is referred to as a "loop-carried true dependence". When a loop-carried dependence and an antidependence exist between two instructions, this relation is referred to as a "loop-carried antidependence". When a loop-carried dependence and an output dependence exist between two instructions, this relation is referred to as a "loop-carried output dependence".

As shown in FIG. 3A, true dependences and an antidependence exist among the three instructions (i.e., the instructions ld, add, and st) within the loop. In this diagram, the true dependence is indicated by an arrow in a solid line whereas the antidependence is indicated by an arrow in a short dashed line.

Here, "ld r0, (r1+)" is an instruction to load data at an address stored in a register r1 from a main memory, to store the data into a register r0, and to increment the value stored in the register r1 by 1. Moreover, "add r2, r0, r0" is an instruction to add the value stored in the register r0 to the value stored in the register r0 and to store the addition result into a register r2. Furthermore, "st (r1), r2" is an instruction to store the value stored in the register r2 into the main memory at an address that is stored in the register r1.

Thus, the true dependence exists between the instruction ld and the instruction add, with the register r0 being a parameter. To be more specific, the register r0 having been defined by the instruction ld is referenced by the instruction add. Note that a latency from the start of execution of the instruction ld until the time when the instruction add becomes executable is 3 cycles. This is accordingly described as "3 (r0)" in the diagram of FIG. 3A.

Similarly, the true dependence exists between the instruction add and the instruction st, with the register r2 being a parameter. Note that a latency between these 2 instructions is 1 cycle. This is accordingly described as "1 (r2)" in the diagram of FIG. 3A.

Moreover, the loop-carried antidependence exists between the instruction st and the instruction ld, with the register r1 being a parameter. To be more specific, the value stored in the register r1 by the instruction ld after being referenced by the instruction st is incremented by 1, so that the register r1 is defined. It should be noted that, in the specification of the present invention, a latency between two instructions having a loop-carried antidependence relation and a latency between two instructions having a loop-carried output dependence relation are both 0 cycle. This is accordingly described as "0 (r1)" in the diagram of FIG. 3A.

Here, in the case of this cyclic path in the data dependence graph including the loop-carried dependence, the number of cycles of the present cyclic path is 4 (=3+1+0). Moreover, this cyclic path has only one loop-carried dependence, meaning that a dependence distance is 1. The "dependence distance" refers to the number of iterations present between two instructions which are loop-carried dependent on each other across two iterations. As shown in FIG. 3B, at least 4 cycles of the initiation interval is required from the start of execution of the instruction ld in an iteration to the start of execution of the instruction ld in the next iteration. Therefore, the initiation interval cannot be shortened to less than the number of cycles of the cyclic path in the dependence graph that includes the loop-carried dependence.

SUMMARY OF THE INVENTION

The present invention was conceived in view of the problems described above, and has an object of providing a compiler apparatus which can perform software pipelining optimization so that the number of execution cycles taken to complete a loop process can be significantly reduced.

In order to achieve the stated object, the compiler apparatus according to an aspect of the present invention converts a source program into a machine language program for a processor which is capable of parallel processing, and is composed of: a parsing unit operable to parse the source program and then to convert the source program into an intermediate program which is described in an intermediate language; an optimization unit operable to optimize the intermediate program; and a conversion unit operable to convert the optimized intermediate program into the machine language program, wherein the optimization unit is operable to execute software pipelining, by inserting a transfer instruction, which is used for transferring data between operands, into a loop process included in the intermediate program so that a data dependence relation is changed. To be more specific, the optimization unit has: a cyclic path detection unit operable to create a data dependence graph representing dependence relations among instructions existing in the intermediate program, and to detect a cyclic path which is a closed path that starts and ends with an instruction, the cyclic path tracing data dependences of the instruction in the data dependence graph; an insertion unit operable to insert the transfer instruction whose operands include a parameter of a loop-carried dependence included in the detected cyclic path; and a software pipelining unit operable to execute software pipelining on the intermediate program into which the transfer instruction has been inserted.

By the insertion of the transfer instruction into the loop, the closed path in the data dependence graph of the original loop can be divided into a plurality of closed paths. With this, there is a possibility of reducing the maximum number of cycles of the closed path in the data dependence graph of the original loop. This, in turn, leads to a possibility of shortening the initiation interval and of reducing the number of execution cycles taken to complete the loop process, after the software pipelining optimization is executed. Accordingly, the present invention can provide a compiler apparatus which can perform software pipelining optimization that has a considerable effect of reducing the number of execution cycles taken to complete a loop process.

For example, the insertion unit may include: an instruction selection unit operable to select an instruction on which a different instruction is true dependent and which is loop-carried antidependent, in the detected cyclic path; an instruction replacement unit operable to replace a first register that is used in the selected instruction with a second register; and a transfer instruction insertion unit operable to insert the transfer instruction for transferring a value stored in the first register to the second register. Moreover, the insertion unit may include: an instruction selection unit operable to select an instruction which is true dependent and on which a different instruction is loop-carried antidependent, in the detected cyclic path; an instruction replacement unit operable to replace a first register that is defined by the selected instruction with a second register; and a transfer instruction insertion unit operable to insert the transfer instruction for transferring a value stored in the second register to the first register.

With this structure, the dependence relation existing as the loop-carried antidependence in the closed path of the data dependence graph is divided, so that a new cyclic path in which the placement constraints have been eased can be generated. This leads to a possibility of reducing the number of execution cycles taken to complete the loop process. Accordingly, the present invention can provide a compiler apparatus which can perform software pipelining optimization that has a considerable effect of reducing the number of execution cycles taken to complete a loop process.

Preferably, the cyclic path detection unit is operable to detect at least one cyclic path which has a longest total latency of data dependences, and the instruction selection unit is operable to, when there exist a plurality of cyclic paths which each have the longest total latency, select an instruction, from among instructions which are loop-carried dependent in the cyclic paths or on each of which a different instruction is loop-carried dependent in the cyclic paths, that is loop-carried dependent in a largest number of cyclic paths or that a different instruction is loop-carried dependent on in a largest number of cyclic paths.

In this way, it is preferable to select the instruction which is loop-carried dependent or on which a different instruction is loop-carried dependent in the greatest number of the cyclic paths. With this selection, more path lengths can be reduced. Accordingly, the software pipelining optimization that has a considerable effect of reducing the number of execution cycles can be performed. In addition, the instruction placement constraints during instruction scheduling can be eased.

Moreover, the cyclic path detection unit may be operable to detect a cyclic path which has a longest path length, the path length representing a total latency of data dependences in the cyclic path.

The minimum initiation interval in the loop process is determined depending on the longest path length of the cyclic path. Thus, detection of such a cyclic path that has the longest path length and insertion of a transfer instruction into that cyclic path lead to a possibility of shortening the initiation interval. This, in turn, leads to a possibility of reducing the number of execution cycles taken to complete the loop process.

Preferably, the cyclic path detection unit is operable to detect a resource constrained cyclic path which has a longest resource constrained path length.

Detection of a cyclic path that has the longest path length with consideration given to constraints imposed on the hardware resources or the like can lead to a possibility of shortening the path length of the cyclic path that is a real bottleneck. Accordingly, the number of execution cycles taken to complete the loop process can be reduced, and the instruction placement constrains during instruction scheduling can be also eased.

Moreover, the cyclic path detection unit is operable to detect a cyclic path other than a cyclic path which is made up of two instructions and in which a same one register causes both a true dependence and a loop-carried antidependence.

When a transfer instruction is inserted into a cyclic path which is made up of two instructions and in which the same register causes both a true dependence and a loop-carried antidependence, the path length or the initiation interval cannot be shortened. For such a cyclic path, the cyclic path detection may not be performed, so that the optimization effect can be accordingly improved.

Furthermore, the cyclic path detection unit may be operable to detect a cyclic path in which a latency incurred by an instruction that is true dependent and that a different instruction is loop-carried antidependent on is longer than a latency incurred by the transfer instruction.

A cyclic path whose path length would become longer by the insertion of a transfer instruction can be eliminated in advance. Consequently, the cyclic path selection can be appropriately performed with enhanced speed and efficiency.

A program according to another aspect of the present invention is for a processor which is capable of parallel processing, the program causing the processor to execute: an instruction for executing iterations of a loop process in parallel; and a transfer instruction for transferring data between operands used in an instruction making up a closed path which starts and ends with a same instruction, the closed path tracing data dependences of the instruction included in a data dependence graph created with respect to the loop process.

As compared to a program in which a transfer instruction is not inserted, the initiation interval of this program is shorter because the transfer instruction has been inserted into the loop process. Accordingly, the present invention can provide a program which is capable of extremely high-speed execution.

It should be noted here that the present invention may be realized not only as a compiler apparatus that has these characteristic units, but also as: a compiling method that has steps corresponding to the characteristic units provided in such a compiler apparatus; and a compiler that causes a computer to execute the characteristic steps included in the compiling method. Also, it should be understood that such a compiler can be distributed via a record medium such as a CD-ROM (Compact Disc-Read Only Memory), or via a communication network such as the Internet.

The present invention can provide a compiler apparatus which can perform software pipelining optimization that has a considerable effect of reducing the number of execution cycles taken to complete a loop process.

Recent years have seen an increased introduction of processors which are capable of parallel processing. A loop process may frequently occur during the course of program execution. Thus, as a machine language program created by the compiler apparatus of the present invention is capable of high-speed execution, its practical value is significantly high.

FURTHER INFORMATION ABOUT TECHNICAL BACKGROUND TO THIS APPLICATION

The disclosure of Japanese Patent Application No. 2005-165999 filed on Jun. 6, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

The following is a description of a compiler apparatus according to an embodiment of the present invention, with reference to the drawings.

Figure 4:
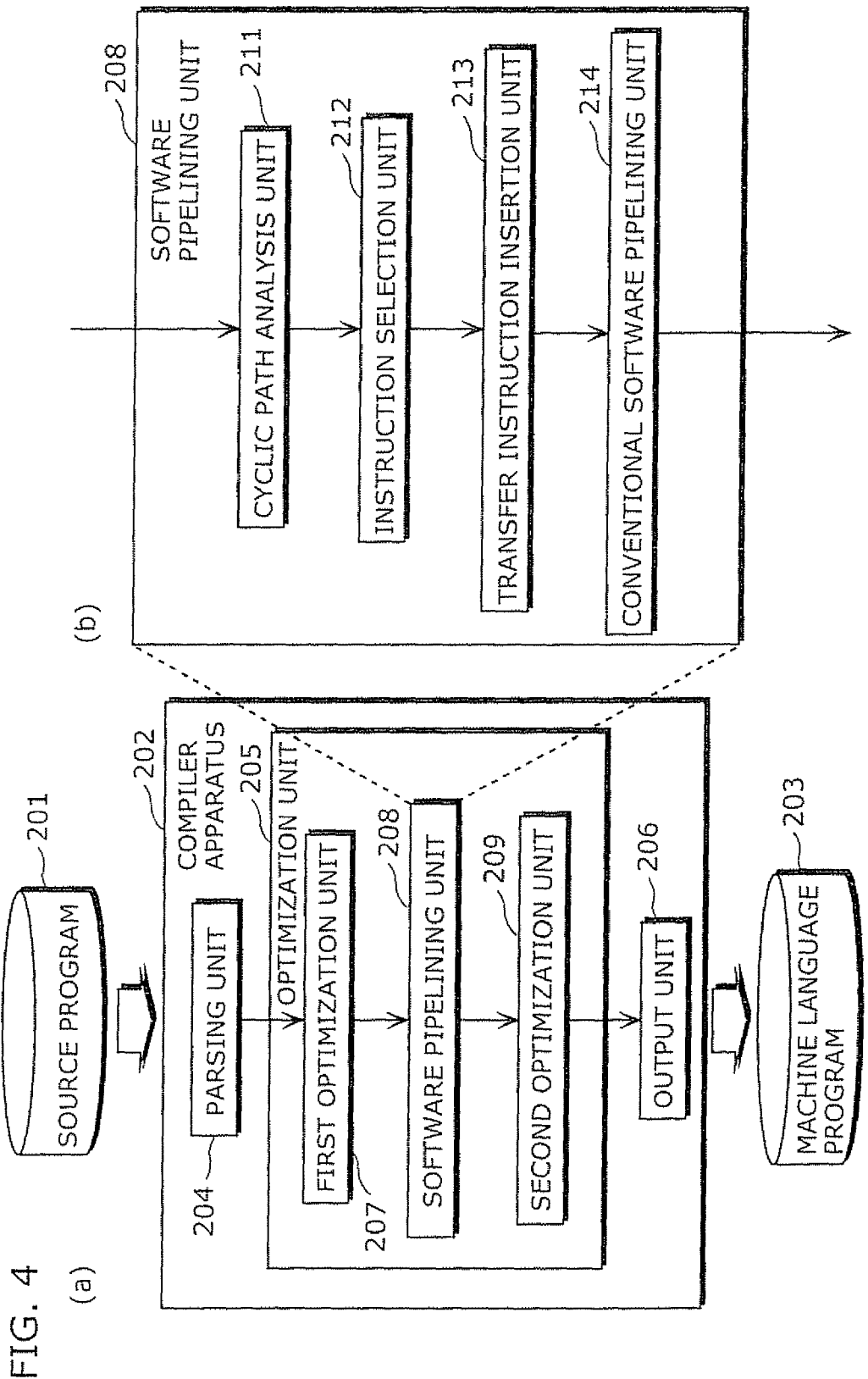
FIG. 4 is a functional block diagram showing a structure of a compiler apparatus.

FIG. 4 is a functional block diagram showing a structure of the compiler apparatus. More specifically, FIG. 4 (a) is a functional block diagram showing an entire structure of the compiler apparatus whereas FIG. 4 (b) is a functional block diagram showing a structure of a software pipelining unit which is a part of the compiler apparatus.

As shown in FIG. 4 (a), a compiler apparatus 202 converts a source program 201 described in a high-level language, such as the C language, into a machine language program 203 which is executable by a processor. The compiler apparatus 202 is composed of a parsing unit 204, an optimization unit 205, and an output unit 206. In the present embodiment, the target processor of the compiler apparatus 202 is a processor that is capable of executing a plurality of instructions in parallel.

The parsing unit 204 is a processing unit which performs a parsing process on the inputted source program 201 and then outputs a program described in an intermediate language. Hereafter, the program described in the intermediate language is referred to as an "intermediate program". The optimization unit 205 is a processing unit which performs a predetermined optimization process on the intermediate program. The output unit 206 is a processing unit which converts the intermediate program, on which the optimization process has been performed, into a machine language program and then outputs the program.

The optimization unit 205 has a first optimization unit 207, a software pipelining unit 208, and a second optimization unit 209. Each of the first optimization unit 207 and the second optimization unit 209 performs a general optimization process. The software pipelining unit 209 is a processing unit which optimizes a loop process included in the intermediate program by executing a software pipelining process.

As shown in FIG. 4 (b), the software pipelining unit 208 has a cyclic path analysis unit 211, an instruction selection unit 212, a transfer instruction insertion unit 213, and a conventional software pipelining unit 214.

The cyclic path analysis unit 211 is a processing unit which creates a data dependence graph representing dependence relations among the instructions included in the intermediate program and which analyzes a cyclic path in the data dependence graph. A definition of the cyclic path is described later. The instruction selection unit 212 is a processing unit which selects, in accordance with the analysis result given by the cyclic path analysis unit 211, an instruction from the data dependence graph, into which a transfer instruction is to be inserted. Here, the "transfer instruction" refers to an instruction at which data can be transferred between the operands, and generally is what is termed an instruction mov that moves data between the registers. The transfer instruction insertion unit 213 is a processing unit which inserts a transfer instruction into the instruction selected by the instruction selection unit 212. The conventional software pipelining unit 214 is a processing unit which executes the conventional software pipelining process on the intermediate program after the transfer instruction has been inserted.

It should be noted here that each processing unit making up the compiler apparatus 202 is realized as a program that is executed on a computer.

The following are definitions of the terms used throughout the present specification.

(1) Cyclic path: A closed path of a data dependence graph, which is traced along the data dependences of an instruction and which begins and ends with the same instruction. Note that, in the cyclic path, the same instruction is not traced more than once.

(2) Path length: A total latency of the data dependences in the cyclic path.

(3) Resource constrained cyclic path: A cyclic path with consideration given to the resource constraints (i.e., the constraints imposed on the hardware resources and on the number of instructions executable in parallel).

(4) Resource constrained path length: A total latency of the data dependences in the resource constrained cyclic path.

(5) Longest path: A longest cyclic path.

(6) Resource constrained longest path: A longest cyclic path with consideration given to the resource constraints.

(7) Leaf node: An instruction which the other instruction is true dependent on and which is antidependent, in the cyclic path.

(8) Root node: An instruction which is true dependent and which the other instruction is antidependent on, in the cyclic path.

A principal object of the present invention is to improve software pipelining in performance by inserting a transfer instruction into a leaf node or a root node in a cyclic path or a resource constrained cyclic path. For this reason, a detailed explanation will be given only as to the process executed by the software pipelining unit 208 in the present embodiment. The other processing units of the compiler apparatus 202 respectively have the same functions as those of a conventional compiler apparatus, and thus detailed explanations of them are not repeated here.

Figure 5:
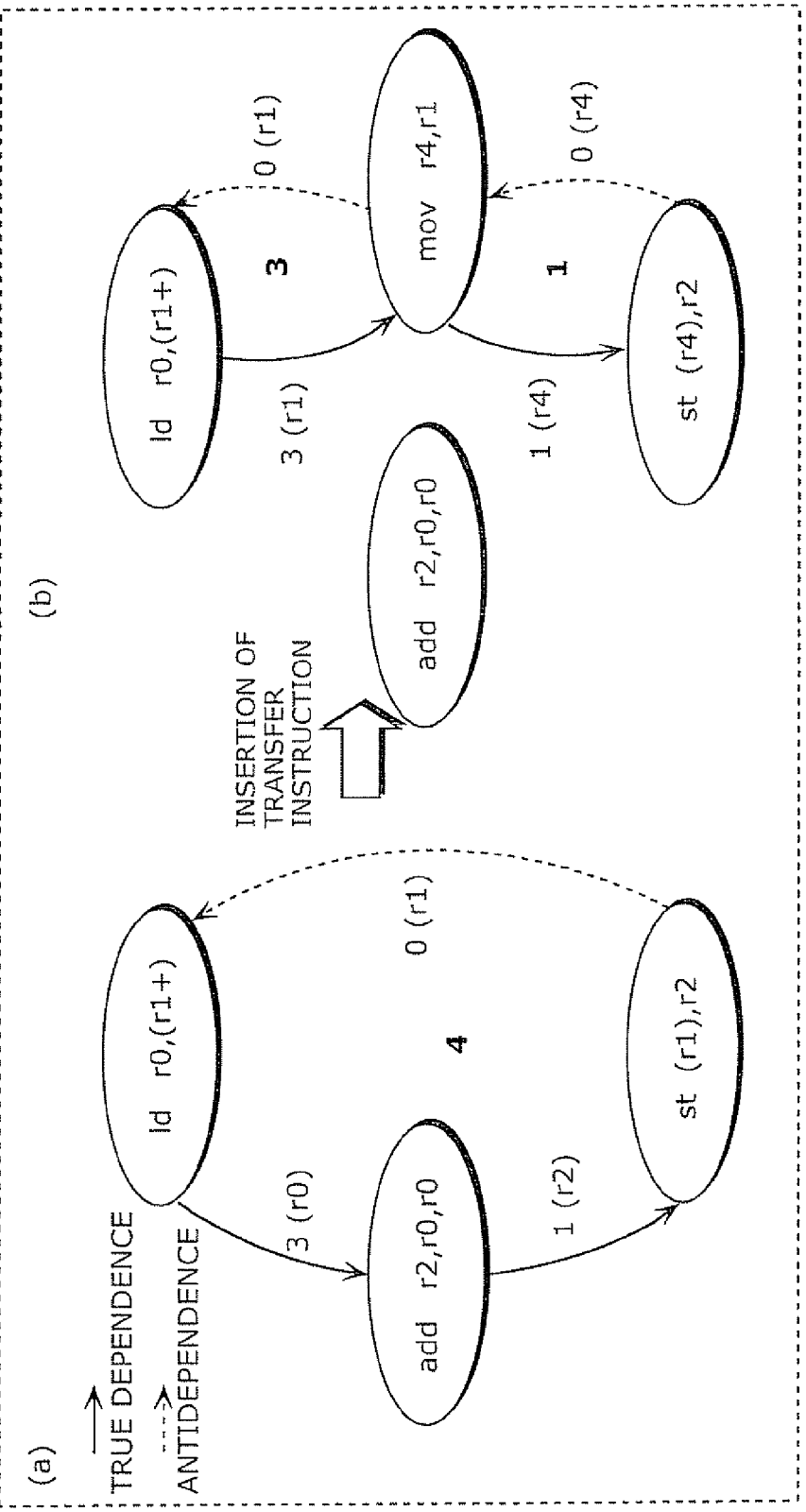
FIG. 5 is a diagram showing changes in a data dependence graph before and after the insertion of a transfer instruction into a cyclic path.

First, an explanation is given as to workings and effects achieved by the insertion of a transfer instruction into the cyclic path. FIG. 5 is a diagram showing changes in a data dependence graph before and after the insertion of the transfer instruction into the cyclic path.

Figure 1:
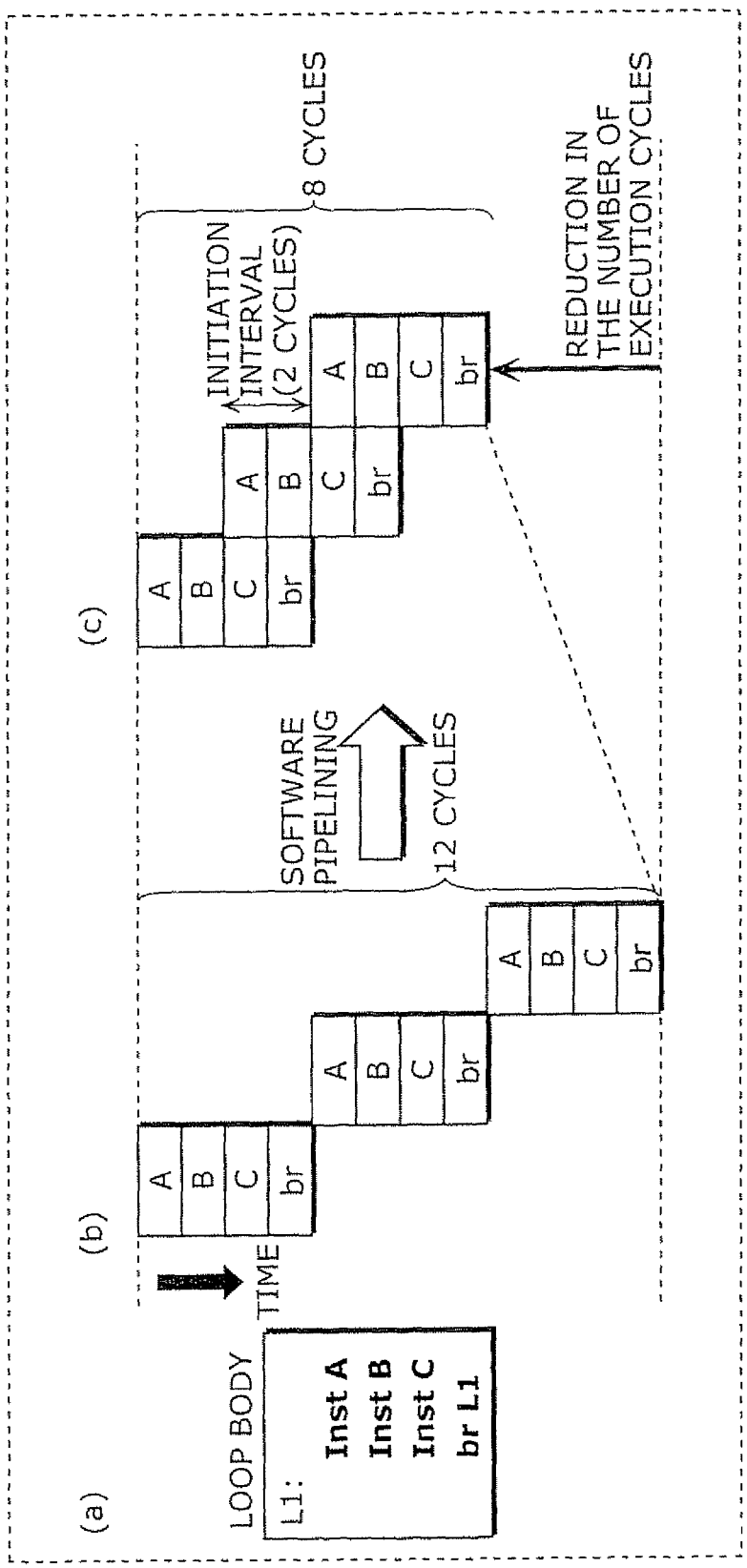
FIG. 1 is a diagram illustrating software pipelining.
Figure 2:
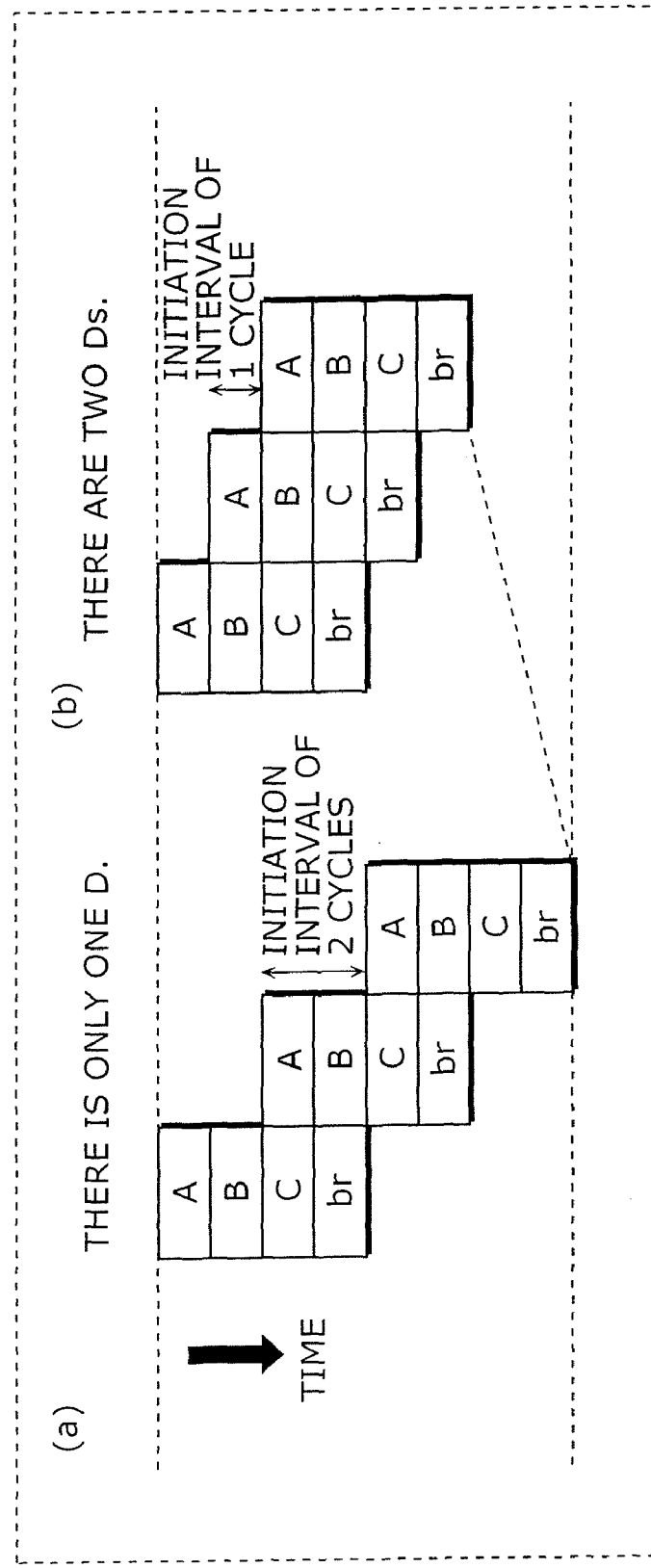
FIG. 2 to FIG. 3B are diagrams illustrating the conventional problems.
Figure 3B:
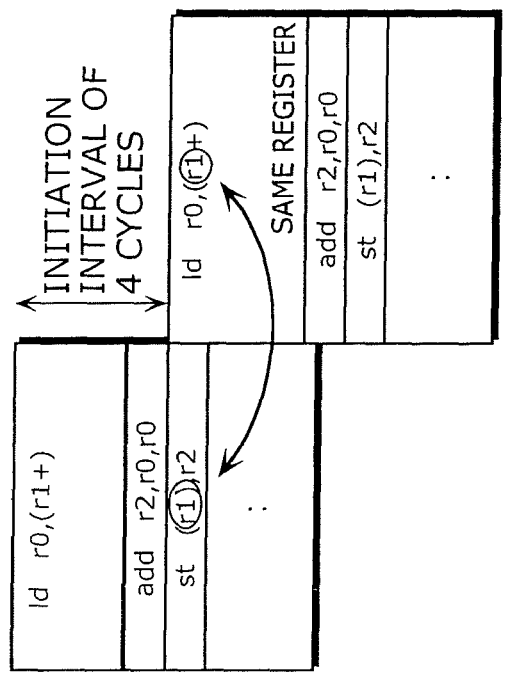
Figure 3A:
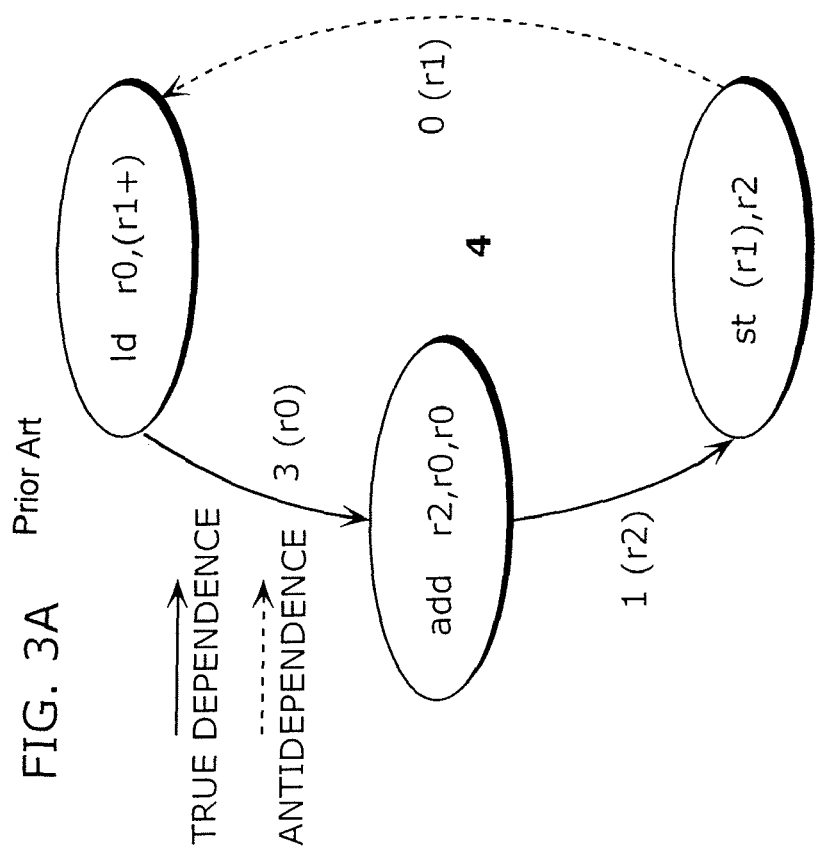

FIG. 5 (a) shows the same cyclic path as the one in the data dependence graph shown in FIG. 3A. This cyclic path includes three instructions within the loop, which are instructions ld, add, and st. The path length of this data dependence graph is 4 cycles. Meanwhile, FIG. 5 (b) shows the cyclic path obtained after an instruction mov, which is a kind of transfer instruction, has been inserted into the leaf node (i.e., the instruction st) of the cyclic path shown in FIG. 5 (a). To be more specific, instead of the instruction st, an instruction "st (r4), r2" is used. In this instruction, a register r1 which is a parameter used by the instruction st for a loop-carried dependence is replaced with an unused register r4. Also, a transfer instruction "mov r4, r1" is inserted, so that a value stored in the register r1 which is the original parameter is stored into the register r4. By this insertion of the instruction mov into the leaf node, the cyclic path whose path length was 4 cycles is divided into 2 cyclic paths. That is, one is made up of instructions ld and mov and its path length is 3 cycles, and the other is made up of instructions mov and st and its path length is 1 cycle. As can be understood from this, by the insertion of the transfer instruction, the original loop-carried dependence is cut up. In the present specification, when a loop-carried dependence is cut up so that new cyclic paths are created in this way, this cutting process is referred to as "loop-carried dependence cut".

As mentioned above, the minimum value of the initiation interval by software pipelining is determined depending on the longest path length. This means, in the case where the cyclic path shown in FIG. 5 (a) is the longest path of the present loop process, the initiation interval can be reduced from 4 to 3.

Figure 6:
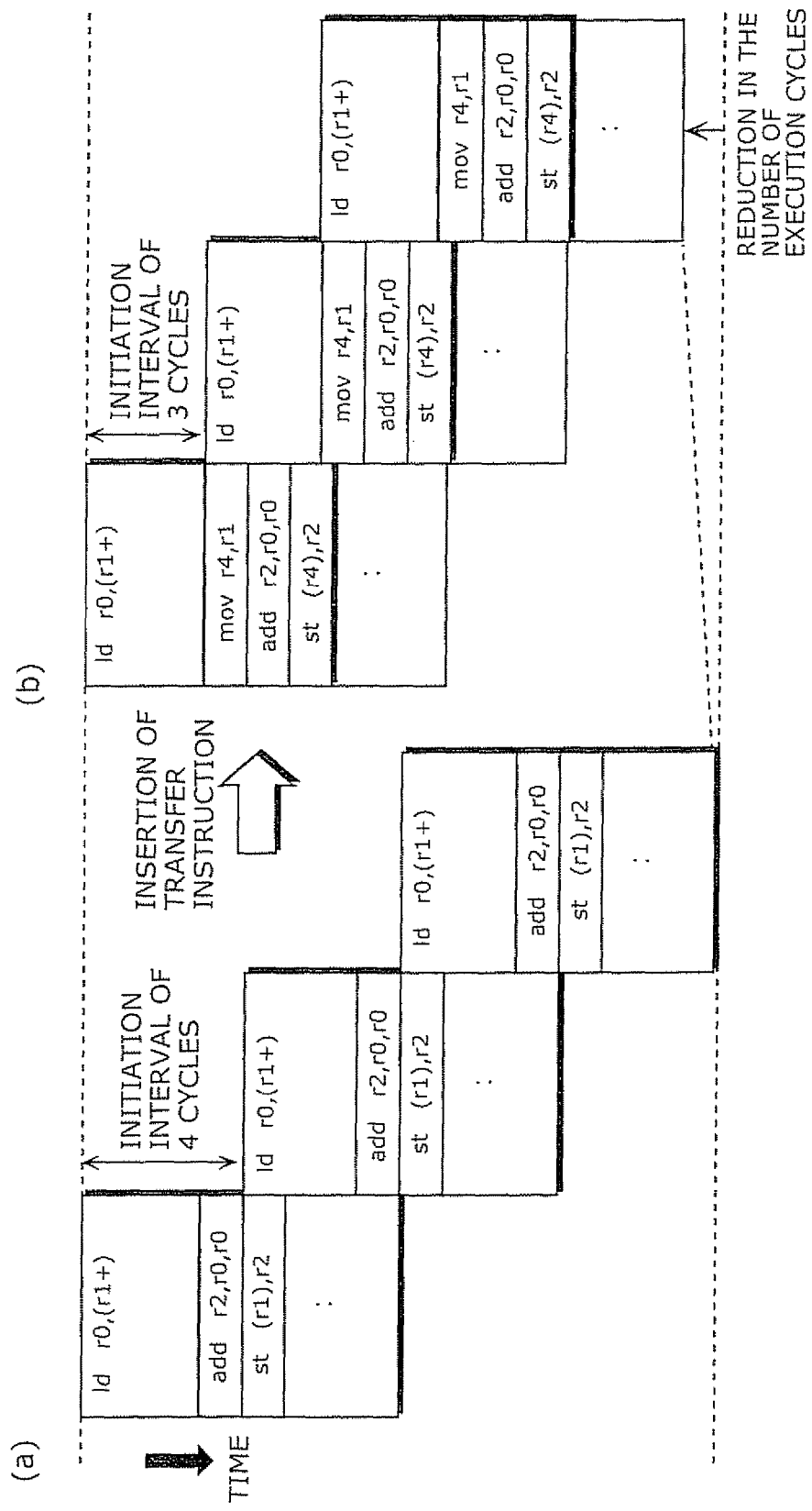
FIG. 6 is a diagram showing respective results of software pipelining executed before and after the insertion of a transfer instruction.

FIG. 6 is a diagram showing respective results of software pipelining performed before and after the insertion of the transfer instruction. FIG. 6 (a) shows the result of software pipelining which is performed before the transfer instruction is inserted, and the resultant initiation interval is 4 cycles. Meanwhile, FIG. 6 (b) shows the result of software pipelining which is performed after the transfer instruction has been inserted, and the resultant initiation interval is 3 cycles. By the insertion of the transfer instruction, although there is a possibility of increasing the number of execution cycles per iteration, the initiation interval is shortened. Therefore, for the loop as a whole, the number of execution cycles is reduced. The greater the number of iterations, the larger this effect is.

Moreover, as shown in FIG. 5, the dependence distance between the instructions st and ld is increased from 1 to 2. Accordingly, the instruction placement constraint during software pipelining is eased.

Figure 7:
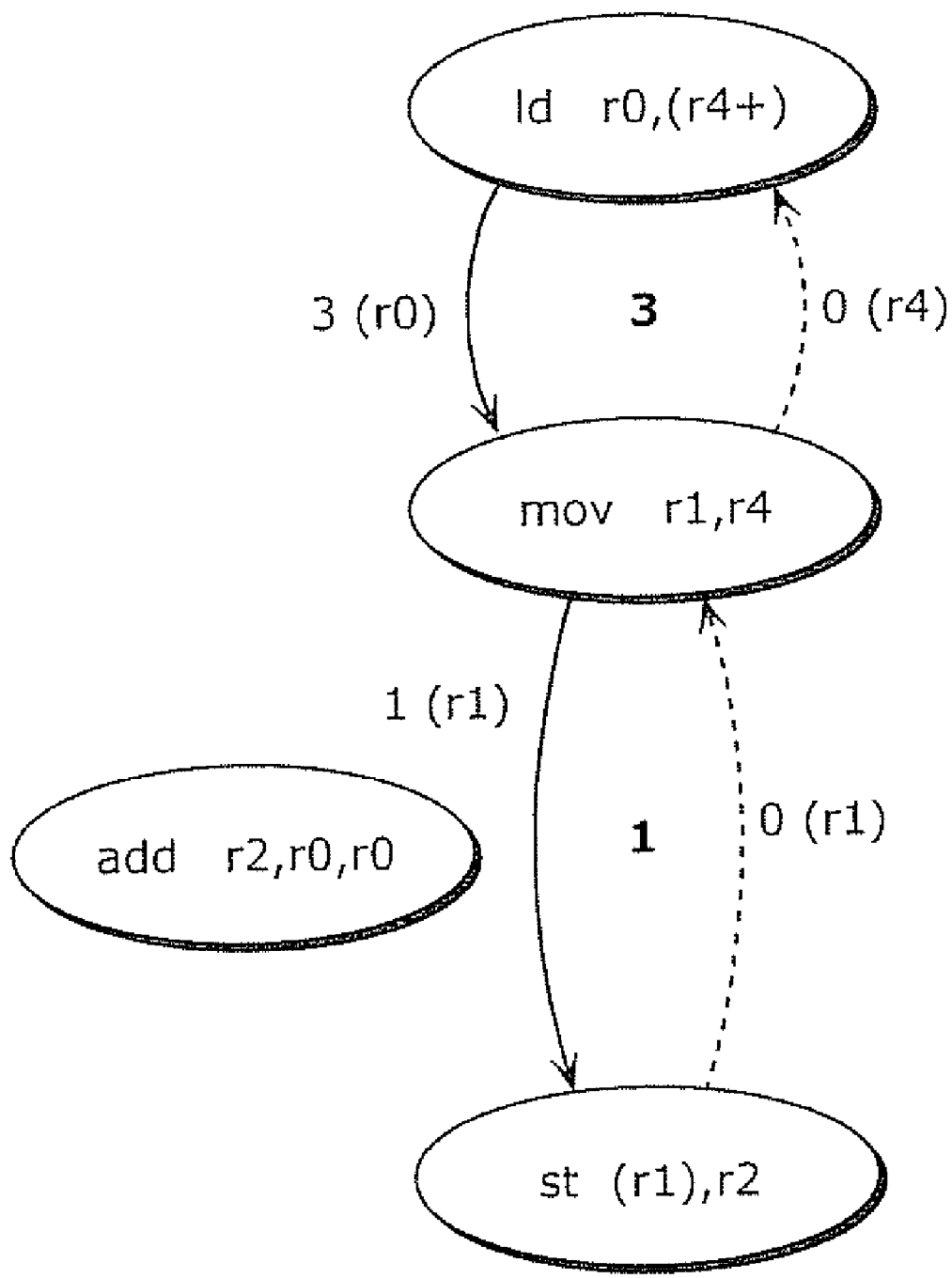
FIG. 7 is a diagram showing a cyclic path obtained after an instruction mov has been inserted into a root node (an instruction ld) of the cyclic path shown in FIG. 5 (a)

FIG. 7 is a diagram showing a cyclic path obtained after an instruction mov has been inserted into the root node (the instruction ld) of the cyclic path shown in FIG. 5 (a). To be more specific, instead of the instruction ld, an instruction "ld r0, (r4+)" is used. In this instruction, the register r1 which is a parameter used by the instruction ld is replaced with the unused register r4. Also, a transfer instruction "mov r4, r1" is inserted, so that a value stored in the register r4 is stored into the register r1 that is the original parameter. By this insertion of the instruction mov into the root node, the cyclic path whose path length was 4 cycles is divided into 2 cyclic paths. That is, one is made up of instructions ld and mov and its path length is 3 cycles, and the other is made up of instructions mov and st and its path length is 1 cycle. As explained above with reference to FIGS. 5 and 6, there is a possibility of shortening the initiation interval to 3 cycles in this case as well.

Figure 8:
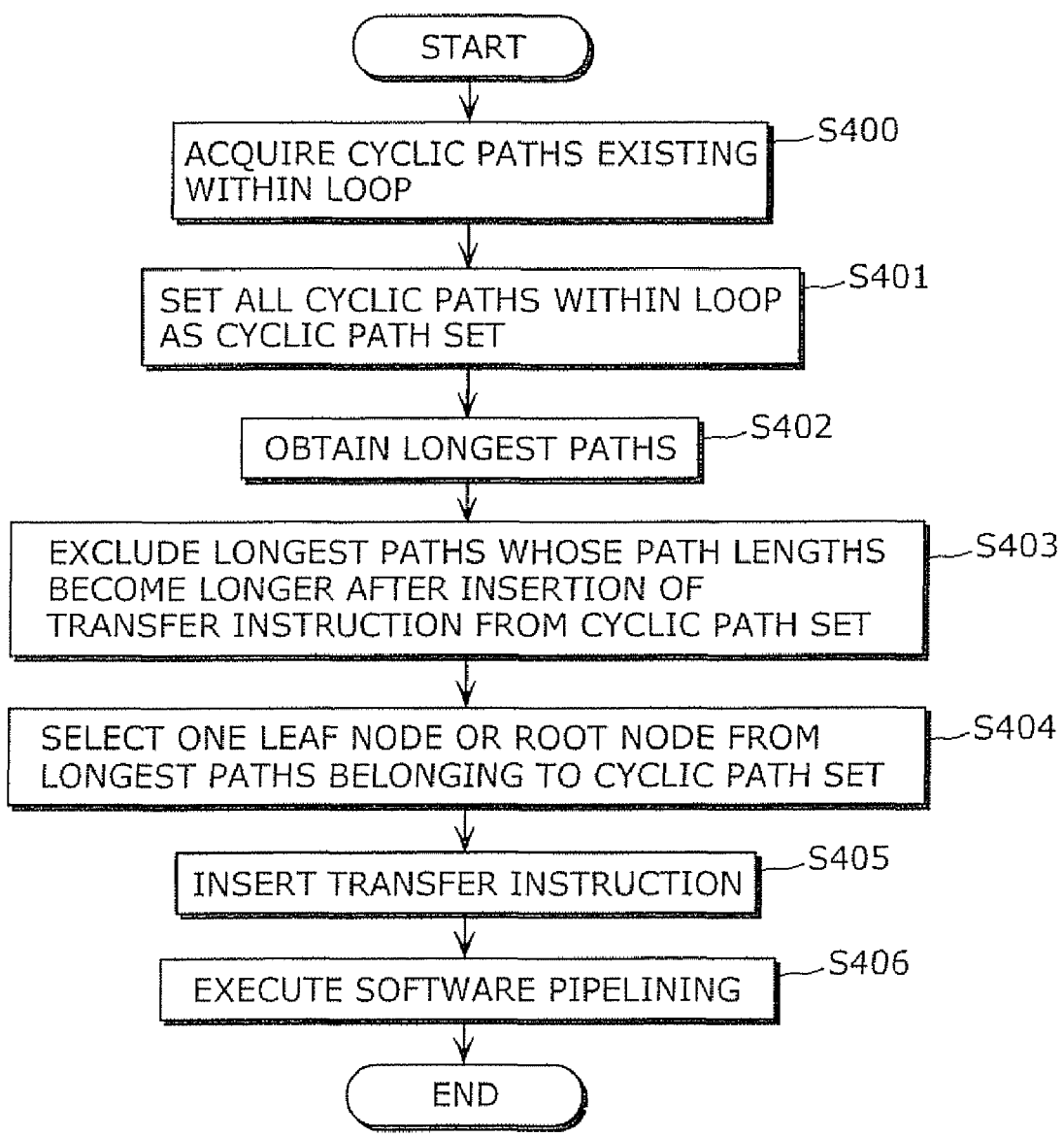
FIG. 8 is a flowchart showing a process performed by a software pipelining unit.

Next, an explanation is given as to a flow of a process executed by the software pipelining unit 208 shown in FIG. 4 (b). FIG. 8 is a flowchart showing the process performed by the software pipelining unit 208.

The cyclic path analysis unit 211 creates a data dependence graph for a loop included in the intermediate program and acquires cyclic paths existing in the data dependence graph (S400). Then, the instruction selection unit 212 sets all the cyclic paths of the loop acquired in the cyclic path acquisition process (S400) as a cyclic path set (S401). Moreover, the instruction selection unit 212 obtains longest paths from the cyclic paths included in the cyclic path set (S402). Then, the instruction selection unit 212 excludes the longest paths whose path lengths will become longer by the insertion of the transfer instruction, from the cyclic path set (S403). Furthermore, the instruction selection unit 212 selects one from among the leaf nodes and the root nodes of the longest paths belonging to the cyclic path set (S404). The transfer instruction insertion unit 213 inserts the transfer instruction into the selected leaf node or root node (S405). Then, the conventional software pipelining unit 214 executes the software pipelining process on the loop process into which the transfer instruction has been inserted (S406).

The above examples of FIGS. 5 and 6 show the cases where the transfer instruction is inserted into the leaf node of the longest path that has the loop-carried antidependence relation and then software pipelining is performed. Meanwhile, the example of FIG. 7 shows the case where the transfer instruction is inserted into the root node of the longest path that has the loop-carried antidependence relation and then software pipelining is performed.

As described earlier, the data dependences can be grouped under three classes, which are true dependence, antidependence, and output dependence. Similarly, the loop-carried dependence can be grouped under true dependence, antidependence, and output dependence.

The following are considerations given to changes in the path length in the cases where: the transfer instruction is inserted into the longest path that has the loop-carried antidependence relation; the transfer instruction is inserted into the longest path that has the loop-carried output dependence relation; and the transfer instruction is inserted into the longest path that has the loop-carried true dependence relation.

[Loop-Carried Antidependence]

Figure 9C:
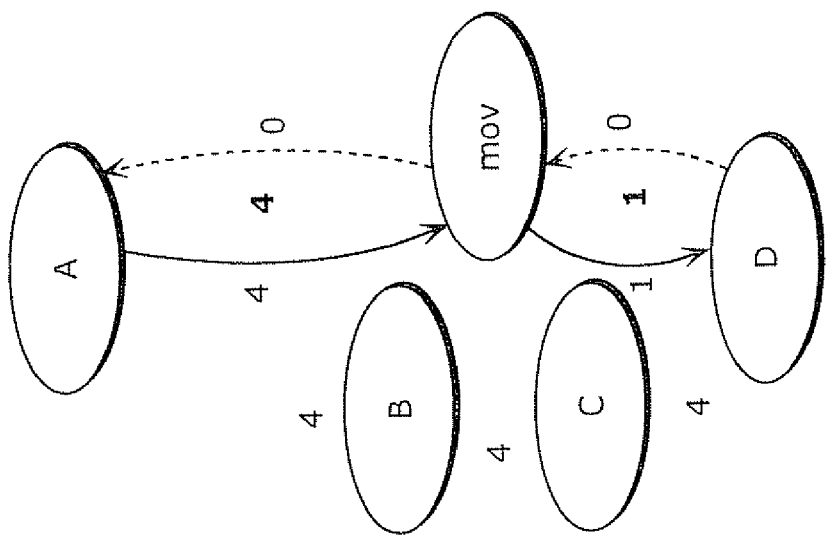
FIGS. 9A to 9C are diagrams showing changes before and after the insertion of a transfer instruction into a cyclic path that has a loop-carried antidependence.
Figure 9B:
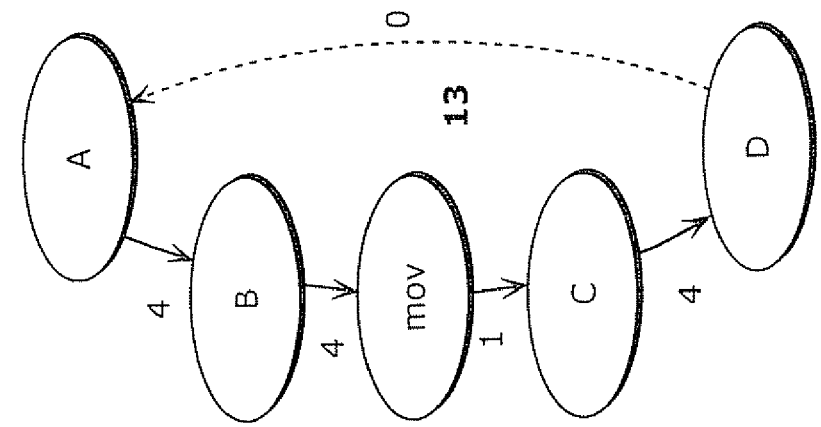
Figure 9A:
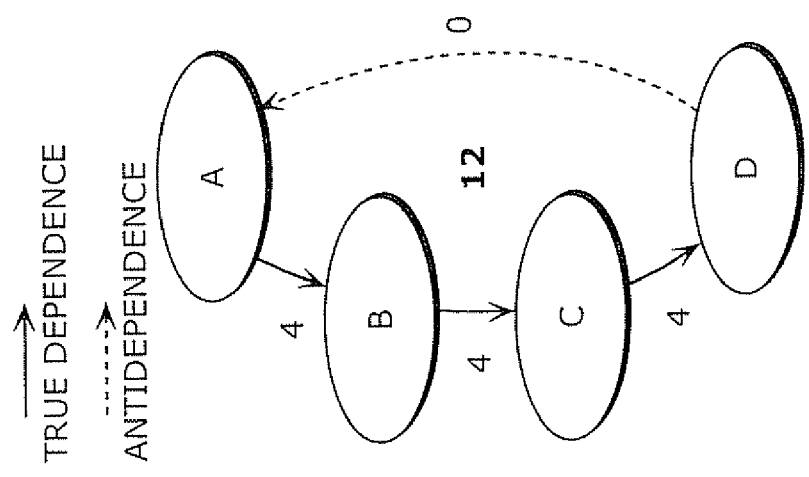

FIGS. 9A to 9C are diagrams showing changes before and after the insertion of a transfer instruction into the cyclic path which has a loop-carried antidependence.

FIG. 9A shows an example of the cyclic path which has the loop-carried antidependence, the cyclic path being made up of instructions A, B, C, and D. Note that, in the present cyclic path, the instruction A is a root node whereas the instruction D is a leaf node. Also note that the loop-carried antidependence exists between the leaf node D and the root node A. In FIGS. 9A to 9C, the true dependence is indicated by an arrow in a solid line whereas the antidependence is indicated by an arrow in a short dashed line. For instance, a latency from the start of execution of the instruction A until the time when the instruction B becomes executable is 4 cycles. Thus, as can be seen in the diagram of FIG. 9A, the path length of the present cyclic path is 12 cycles.

FIG. 9B shows a cyclic path obtained after an instruction mov has been inserted into an instruction other than the leaf node D and the root node A shown in FIG. 9A. This diagram shows a cyclic path of a case where the instruction mov is inserted into the instruction B or C. As shown, the loop-carried dependence relation between the instructions A and D is not changed even after the instruction mov has been inserted into the instruction other than the root node A and the leaf node D. In addition, due to the insertion of the instruction mov, 1 cycle of latency is required between the start of execution of the instruction mov and the start of execution of the instruction C, resulting in increasing the path length from 12 to 13. Thus, the path length cannot be shortened, meaning that the initiation interval cannot be shortened either.

FIG. 9C shows a cyclic path obtained after the instruction mov has been inserted into the leaf node D shown in FIG. 9A. In this example, due to the insertion of the instruction mov into the leaf node D, the loop-carried dependence cut is performed between the instructions A and D. As a result of this, the cyclic path of 12 cycles with a dependence distance of 1 is changed into cyclic paths of 4 cycles and of 1 cycle. As can be understood from this, there is a possibility of shortening the initiation interval from 12 cycles to 4 cycles in the case where the cyclic path shown in FIG. 9A is the longest path. However, when another cyclic path whose path length is 5 cycles or more is present within the loop, that path length would be the minimum initiation interval. Additionally, by the loop-carried dependence cut, the instruction placement constraint can be eased.

Figure 10:
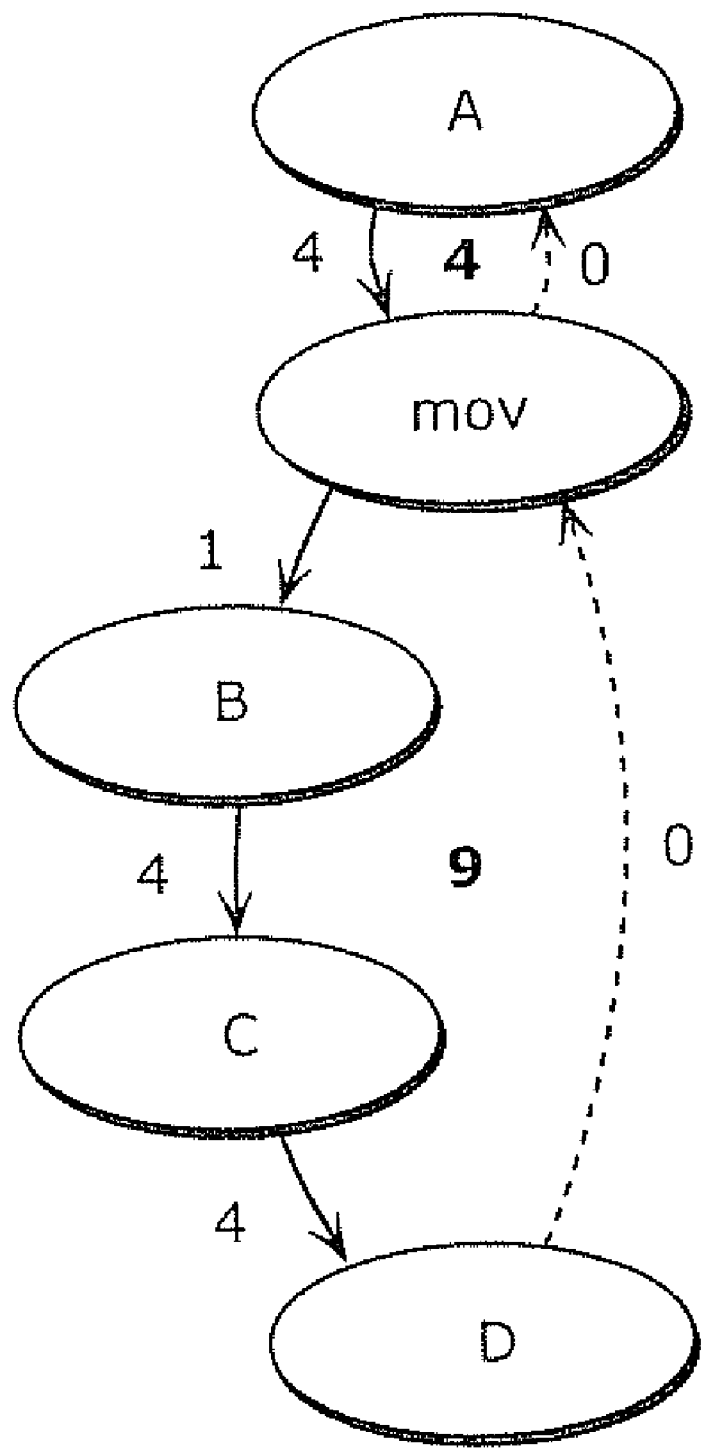
FIG. 10 is a diagram showing a cyclic path obtained after an instruction mov has been inserted into a root node A in the case where the same register causes both the true dependence and the loop-carried antidependence of the root node A shown in FIG. 9A.

FIG. 10 is a diagram showing a cyclic path obtained after an instruction mov has been inserted into the root node A in the case where the same register causes both the true dependence and the loop-carried antidependence for the root node A shown in FIG. 9A. As is the case with the example shown in FIG. 9C, the cyclic path of 12 cycles is changed into cyclic paths of 4 cycles and of 9 cycles by the loop-carried dependence cut. Thus, there is a possibility of shortening the initiation interval from 12 cycles to 9 cycles in the case where the cyclic path shown in FIG. 9A is the longest path. Also, the instruction replacement constraint can be eased.

[Loop-Carried Output Dependence]

Figure 11:
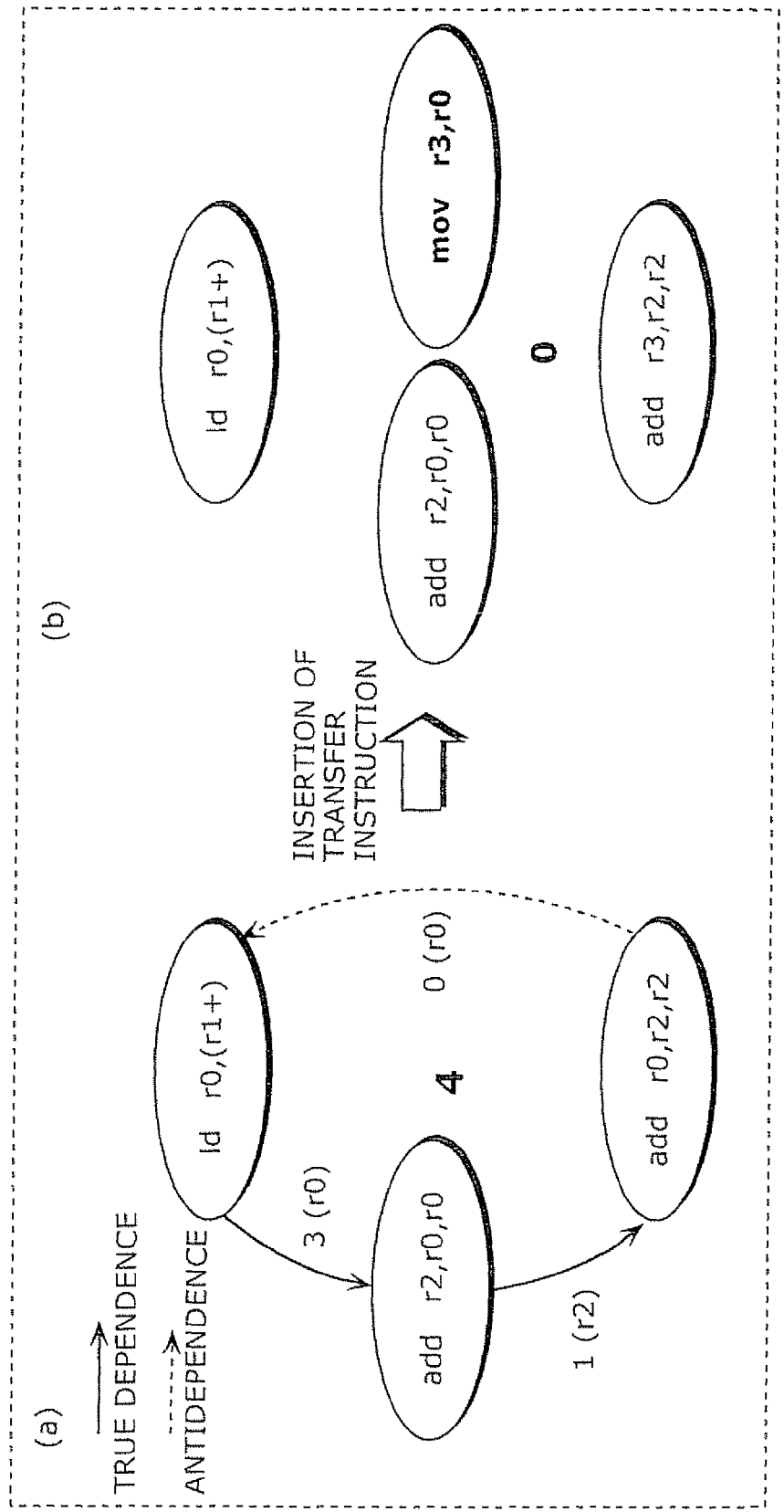
FIG. 11 is a diagram showing changes before and after the insertion of a transfer instruction into a cyclic path that has a loop-carried output dependence.

FIG. 11 is a diagram showing changes before and after the insertion of a transfer instruction into the cyclic path that has a loop-carried output dependence. FIG. 11 (a) shows an example of the cyclic path that has the loop-carried output dependence, the cyclic path being made up of one ld instruction and two add instructions. In this diagram, the true dependence is indicated by an arrow in a solid line whereas the output dependence is indicated by an arrow in a short dashed line.

Here, "ld r0, (r1+)" is an instruction to load data at an address stored in a register r1 from a main memory, to store the data into a register r0, and to increment the value stored in the register r1 by 1. Moreover, "add r2, r0, r0" is an instruction to add the value stored in the register r0 to the value stored in the register r0 and to store the addition result into a register r2. Furthermore, "add r0, r2, r2" is an instruction to add the value stored in the register r2 to the value stored in the register r2 and to store the addition result into the register r0.

Thus, the true dependence exists between the instruction "ld r0, (r1+)" and the instruction "add r2, r0, r0", with the register r0 being a parameter. To be more specific, the register r0 having been defined by the instruction ld is referenced by the instruction add. Note that a latency from the start of execution of the instruction ld until the time when the instruction add becomes executable is 3 cycles. This is accordingly described as "3 (r0)" in the diagram of FIG. 11 (a).

Similarly, a true dependence exists between the instruction "add r2, r0, r0" and the instruction "add r0, r2, r2", with the register r2 being a parameter. Note that a latency between these 2 instructions is 1 cycle. This is accordingly described as "1 (r2)" in the diagram of FIG. 11 (a).

Moreover, a loop-carried output dependence exists between the instruction "add r0, r2, r2" and the instruction "ld r0, (r1+)", with the register r0 being a parameter. To be more specific, after being defined by the instruction add, the value stored in the register r0 is redefined by the instruction ld. Note again, as described earlier, that in the embodiment of the present invention, a latency between the two instructions having a loop-carried dependence is 0 cycle. This is accordingly described as "0 (r0)" in the diagram of FIG. 11 (a).

In the case of this cyclic path in the data dependence graph including such a loop-carried dependence, the path length is 4 (=3+1+0). Moreover, this cyclic path has only one loop-carried dependence, meaning that a dependence distance is 1.

Although this cyclic path has no root node or leaf node that fits the definition described above, consider a case where an instruction mov is inserted into an instruction corresponding to a leaf node, that is, an instruction which is loop-carried dependent. FIG. 11 (b) shows a cyclic path obtained after the instruction mov has been inserted into the instruction "add r0, r2, r2" that is loop-carried dependent in the cyclic path shown in FIG. 11 (a). To be more specific, instead of the instruction "add r0, r2, r2", an instruction "add r3, r2, r2" is used. In this instruction, the register r0 which is a parameter used by the present instruction add for the loop-carried dependence is replaced with an unused register r3. Also, a transfer instruction "mov r3, r0" is inserted, so that the value stored in the register r0 which is the original parameter is stored into the register r3. By this insertion of the instruction mov into the instruction "add r0, r2, r2" which is loop-carried dependent, the loop-carried dependence cut is performed between the instructions add and ld. As a result of this, the cyclic path with a dependence distance of 1 is eliminated.

Figure 12:
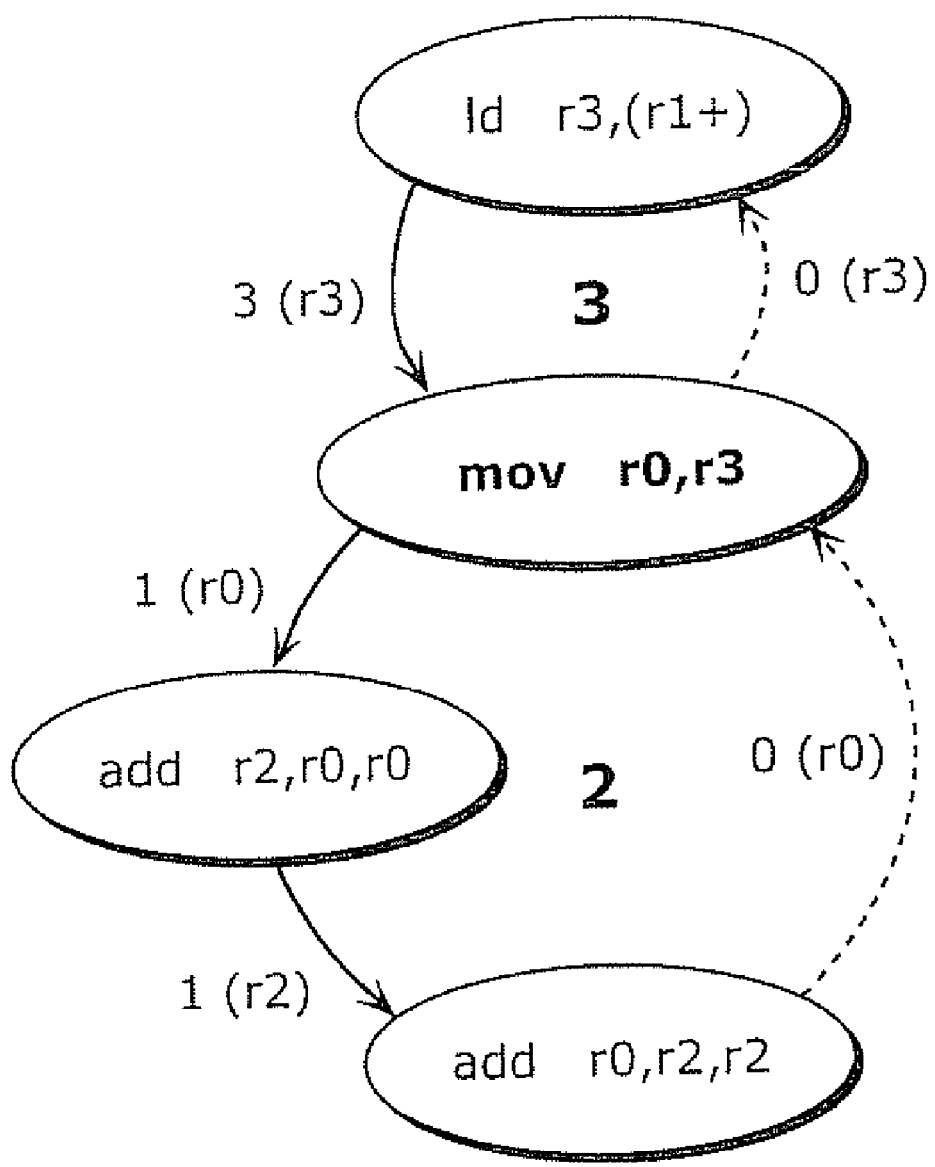
FIG. 12 is a diagram showing a cyclic path obtained after an instruction mov has been inserted into the cyclic path shown in FIG. 11 (a)

FIG. 12 is a diagram showing a cyclic path obtained after the instruction mov has been inserted into an instruction corresponding to a root node of the cyclic path shown in FIG. 11 (a), i.e., the instruction "ld r0, (r1+)" on which the other instruction is loop-carried dependent. To be more specific, instead of the instruction "ld r0, (r1+)", an instruction "ld r3, (r1+)" is used. In this instruction, the register r0 which is a parameter used by the present instruction ld for the loop-carried dependence is replaced with the unused register r3. Also, a transfer instruction "mov r0, r3" is inserted, so that the value stored in the register r3 is stored into the register r0 that is the original parameter. By this insertion of the instruction mov into the root node, the loop-carried dependence cut is performed between the instructions add and ld. As a result of this, the cyclic path whose path length was 4 cycles is divided into 2 cyclic paths. That is, one is made up of instructions ld and mov and its path length is 3 cycles and the other is made up of one mov instruction and two add instructions and its path length is 2 cycles, with a dependence distance of 1. Accordingly, in the case where the cyclic path shown in FIG. 11 (a) is the longest path, there is a possibility of shortening the initiation interval to 3 cycles.

[Loop-Carried True Dependence]

Figure 13:
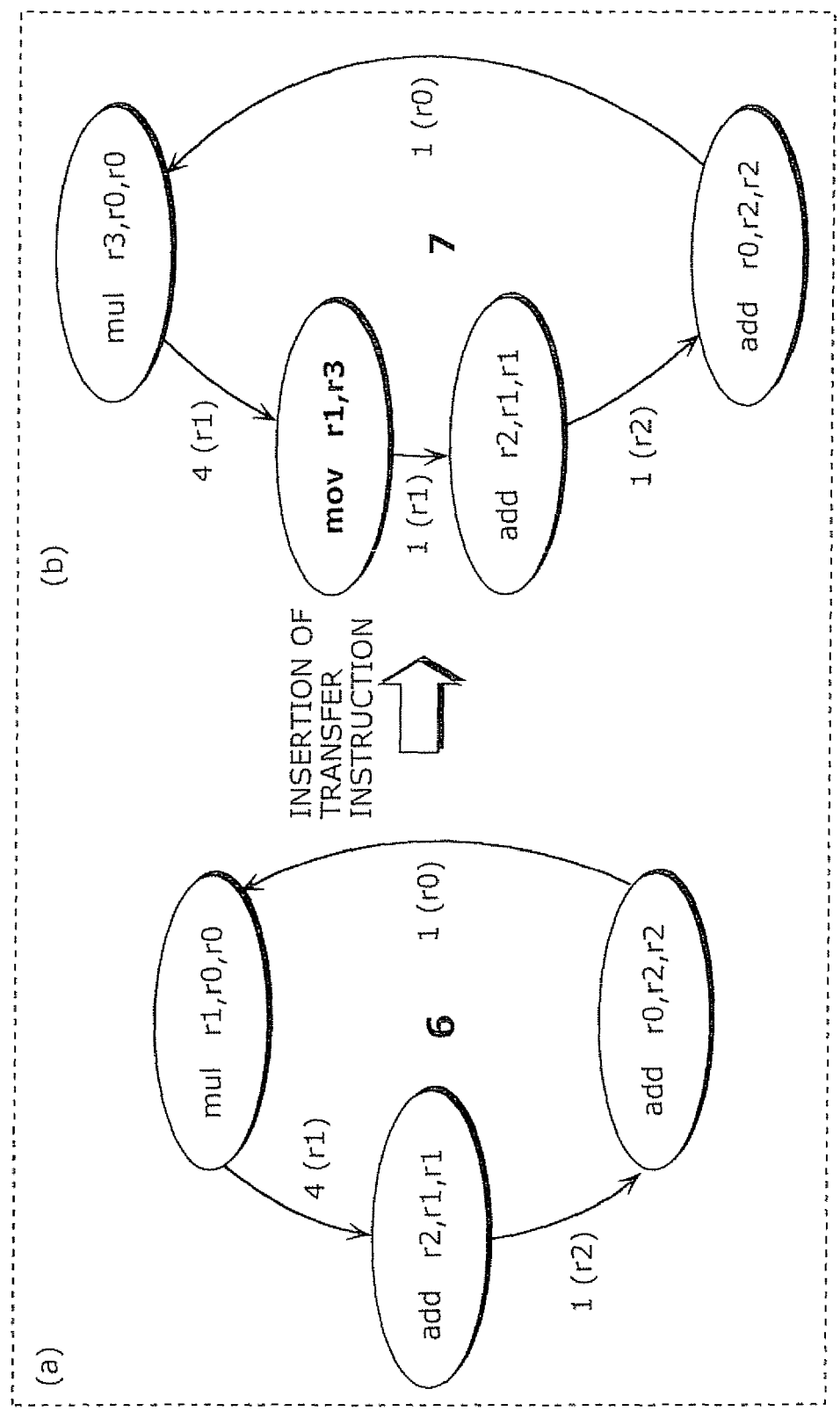
FIG. 13 is a diagram showing changes before and after the insertion of a transfer instruction into a cyclic path that has a loop-carried true dependence.

FIG. 13 is a diagram showing changes before and after the insertion of a transfer instruction into a cyclic path that has a loop-carried true dependence. FIG. 13 (a) shows an example of the cyclic path that has the loop-carried true dependence, the cyclic path being made up of one mul instruction and two add instructions. In this diagram, all the dependence relations are true dependences, each being indicated by an arrow in a solid line.

Here, "mul r1, r0, r0" is an instruction to multiply the data stored in the register r0 by the data stored in the register r0 and to store the multiplication result into the register r1. Moreover, "add r2, r1, r1" is an instruction to add the value stored in the register r1 to the value stored in the register r1 and to store the addition result into the register r2. Furthermore, "add r0, r2, r2" is an instruction to add the value stored in the register r2 to the value stored in the register r2 and to store the addition result into the register r0.

Thus, the true dependence exists between the instruction "mul r1, r0, r0" and the instruction "add r2, r1, r1", with the register r1 being a parameter. To be more specific, the register r1 having been defined by the instruction mul is referenced by the instruction add. Note that a latency from the start of execution of the instruction mul until the time when the instruction add becomes executable is 4 cycles. This is accordingly described as "4 (r1)" in the diagram of FIG. 13 (a).

Similarly, a true dependence exists between the instruction "add r2, r1, r1" and the instruction "add r0, r2, r2", with the register r2 being a parameter. Note that a latency between these 2 instructions is 1 cycle. This is accordingly described as "1 (r2)" in the diagram of FIG. 13 (a).

Moreover, a loop-carried true dependence exists between the instruction "add r0, r2, r2" and the instruction "mul r1, r0, r0", with the register r0 being a parameter. A latency between the 2 instructions is 1 cycle. This is accordingly described as "1 (r0)" in the diagram of FIG. 13 (a).

In the case of this cyclic path of the data dependence graph that includes such a loop-carried dependence, the path length is 6 (=4+1+1).

This cyclic path has no root node or leaf node that fits the definition described above, as all the data dependences within the graph are true dependences. Here, consider a case where the instruction mov is inserted into the instruction mul which is one of the instructions making up the cyclic path. FIG. 13 (b) shows a cyclic path obtained after the instruction mov has been inserted into the cyclic path shown in FIG. 13 (a). To be more specific, instead of the instruction "mul r1, r0, r0", an instruction "mul r3, r0, r0" is used. In this instruction, the register r1 which is a parameter used by the present instruction mul is replaced with the unused register r3. Also, a transfer instruction "mov r1, r3" is inserted, so that the value stored in the register r3 is stored into the register r1 which is the original parameter. Note that a latency from the start of execution of the instruction mov until the time when the instruction add becomes executable is 1 cycle. As a result, the path length after the insertion of the transfer instruction becomes 7 (=4+1+1+1). As can be understood from this, the path length cannot be shortened by the insertion of the transfer instruction. In fact, the path length becomes longer, only increasing the code size. It should be noted here that in the case of the cyclic path made up of only true dependences, the path length cannot be shortened no matter where the transfer instruction is to be inserted. This means the optimization has no effect in such a case.

[Cyclic Path Made Up of Two Instructions]

Next, an explanation is given as to a case where a transfer instruction is inserted into a cyclic path which is made up of two instructions.

Figure 14:
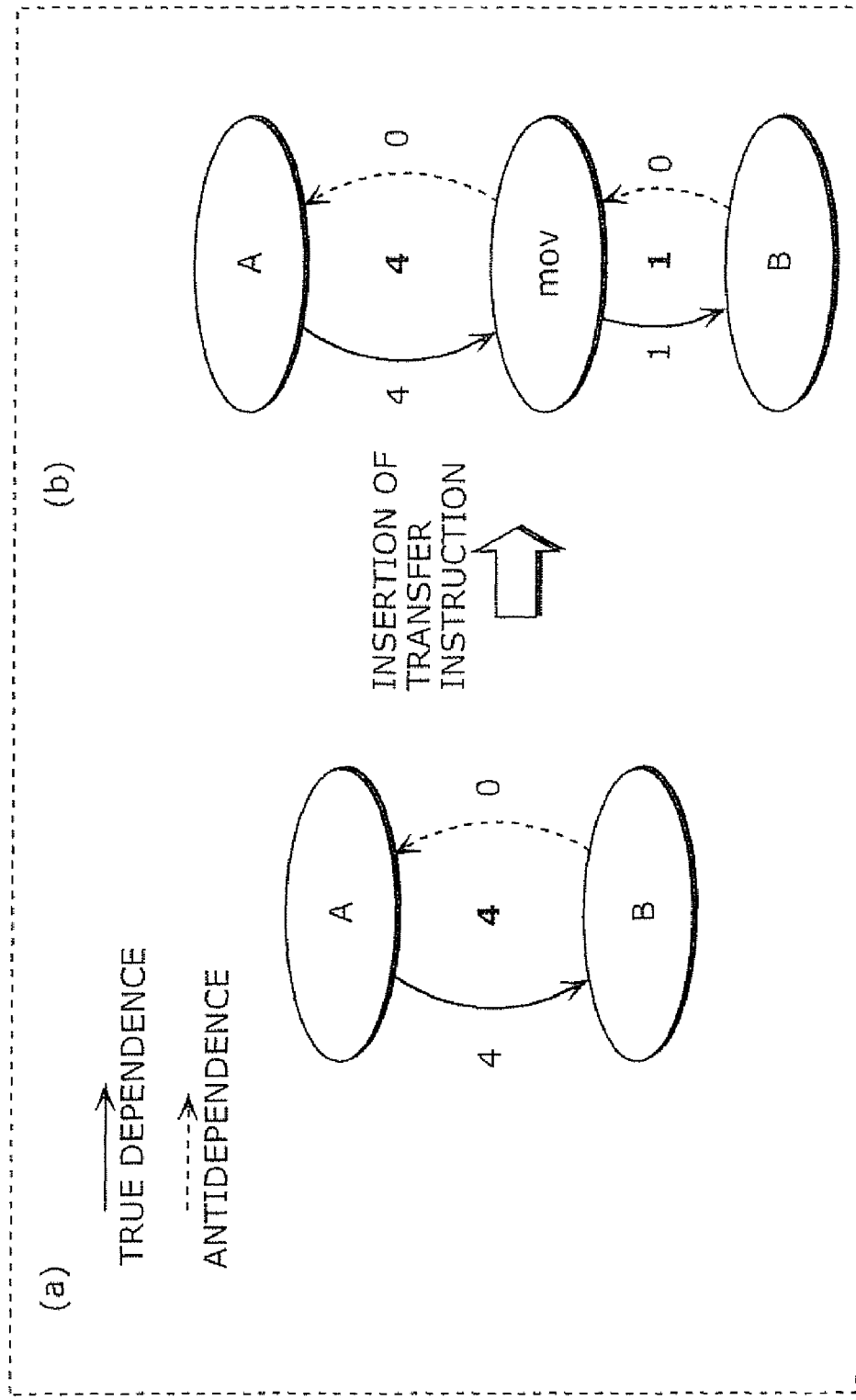
FIG. 14 is a diagram showing changes before and after the insertion of a transfer instruction into a cyclic path that is made up of two instructions.

FIG. 14 is a diagram showing changes before and after the insertion of a transfer instruction into a cyclic path which is made up of two instructions and in which the same register causes both a true dependence and a loop-carried antidependence. FIG. 14 (a) shows an example of the cyclic path having the loop-carried antidependence, the cyclic path being made up of two instructions A and B and the path length being 4 cycles. In this diagram, the true dependence is indicated by an arrow in a solid line whereas the loop-carried antidependence is indicated by an arrow in a short dashed line.

FIG. 14 (b) shows a cyclic path obtained after the instruction mov has been inserted into the root node shown in FIG. 14 (a). By this insertion of the instruction mov, the loop-carried dependence cut is performed. Nevertheless, the path length is still 4 cycles at the maximum. It can be verified that in the case where the transfer instruction is inserted into a root node of a cyclic path made up of two instructions, the initiation interval cannot be shortened, thereby rendering the optimization ineffectual. In fact, the insertion of the instruction mov increases the code size of the machine language program 203, which leads to degradation in performance.

Figure 15:
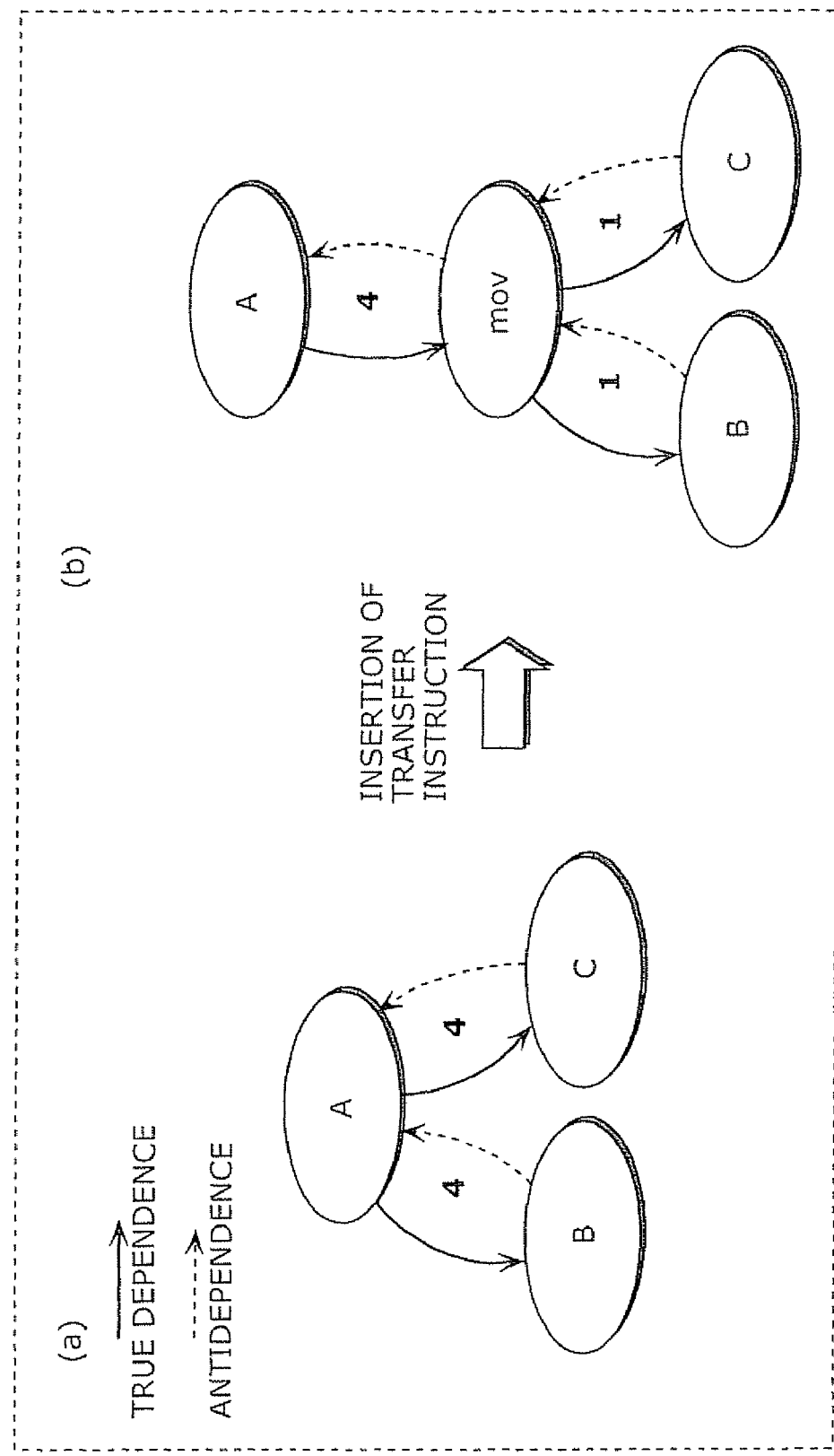
FIG. 15 is a diagram showing changes before and after the insertion of a transfer instruction in the case where two cyclic paths, each being made up of two instructions, are included.

Meanwhile, FIG. 15 is a diagram showing changes before and after the insertion of a transfer instruction in the case where 2 cyclic paths are included, each cyclic path being made up of two instructions and the same register causing both a true dependence and a loop-carried antidependence in the cyclic path.

FIG. 15 (a) shows an example of the cyclic paths that each have a loop-carried antidependence. Here, one cyclic path is made up of instructions A and B whereas the other cyclic path is made up of instructions A and C. In this diagram, the true dependence is indicated by an arrow in a solid line and the loop-carried antidependence is indicated by an arrow in a short dashed line. As can be seen, these 2 cyclic paths have the instruction A as a common root node and each path length is 4 cycles.

FIG. 15 (b) shows a cyclic path obtained after the instruction mov has been inserted into the root node shown in FIG. 15 (a). By the insertion of the instruction mov, the loop-carried dependence cut is performed. As a result, the cyclic path shown in FIG. 15 (a) is changed into 3 cyclic paths with a dependence distance of 1. More specifically, these 3 are: 1 cyclic path with a path length of 4 cycles; and 2 cyclic paths each with a path length of 1 cycle. In this case, the path length is still 4 cycles at the maximum, meaning that the initiation interval cannot be shortened. However, the number of cyclic paths with the path length of 4 cycles is reduced from 2 to 1. Accordingly, the instruction placement constraint imposed during software pipelining is eased, so that the probability of success in software pipelining increases.

[Resource-Constrained Cyclic Path]

Next, an explanation is given as to a case where a transfer instruction is inserted into a cyclic path that is formed in consideration of resource constraints.

Figure 16A:
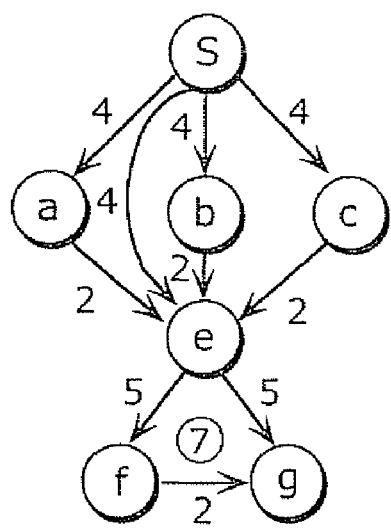
FIG. 16A is a diagram illustrating a longest path in the case where no resource constraints are imposed.
Figure 16B:
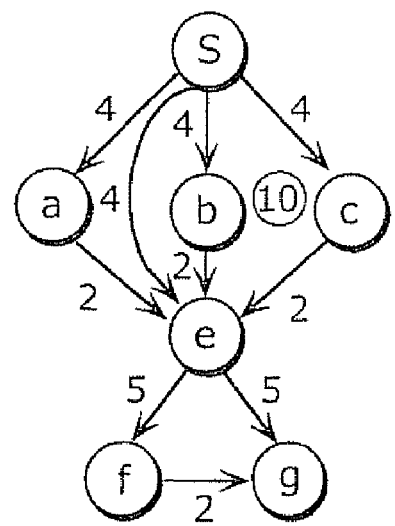
FIG. 16B is a diagram illustrating a longest path in the case where the resource constraints are imposed.

First, a comparison is made between the longest paths in the cases where the resource constraints are imposed and not imposed, using the same dependence graph. FIGS. 16A and 16B are diagrams illustrating the difference between the longest paths. FIG. 16A shows a cyclic path in the case where no resource constraints are imposed whereas FIG. 16B shows a cyclic path that is formed with consideration given to the resource constraints. In these diagrams, the true dependence is indicated by an arrow in a solid line. Here, it should be noted that although not illustrated in these diagram, there is necessarily a loop-carried dependence opposite in direction to the true dependence indicated by the solid line.

As shown in FIG. 16A, when no resource constraints are imposed, the cyclic path made up of instructions e, f, and g is the longest path and its path length is 7 cycles. On the other hand, in the resource-constrained cyclic path as shown in FIG. 16B, instructions a, b, and c use one and the same resource d.

Hereafter, a cyclic path made up of instructions s, a, and e is referred to as the "cyclic path a"; a cyclic path made up of instructions s, b, and e is referred to as the "cyclic path b"; and a cyclic path made up of instructions s, c, and e is referred to as the "cyclic path c". When no resource constraints are imposed, each of their path lengths is 6 cycles. As already mentioned above, however, the instructions a, b, and c share one and the same resource d in common. Suppose here that a latency from the execution start of one of the instructions a, b, and c until the time when the executed instruction releases the resource d is 2 cycles. Note that the instructions a, b, and c are executed in this order as a fixed order of priority.

For the execution of the instructions included in the cyclic path a, the instruction a does not have to wait for the resource d to be released since the other instructions do not use the resource d. On account of this, the resource constrained path length of the cyclic path a is 6 (=4+2+0) cycles. For the execution of the instructions included in the cyclic path b, the instruction b has to wait 2 cycles, even when executable, until the instruction a releases the resource d. Thus, the resource constrained path length of the cyclic path b is 8 (=4+2+2+0) cycles. For the execution of the instructions included in the cyclic path c, the instruction c has to wait 4 (=2+2) cycles, even when executable, until the instructions a and b release the resource d. On account of this, the resource constrained path length of the cyclic path c is 10 (=4+2+2+2+0) cycles. Consequently, the resource constrained longest path is the cyclic path c, and its resource constrained path length is 10 cycles.

In this way, even in the same dependence graph, the longest paths are different depending on whether or not the resource constraints are imposed, and thus the path lengths are also different. In consideration of this, for the case where the resource constraints are imposed, the resource constrained longest path needs to be obtained.

[Cyclic Path Including a Plurality of Longest Paths]

An explanation is next given as to a case where a transfer instruction is inserted into a cyclic path which includes a plurality of longest paths.

Figure 17C:
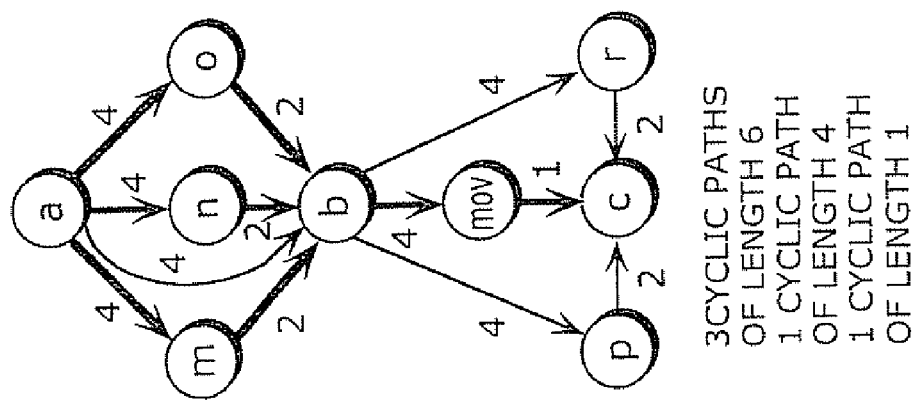
FIGS. 17A to 17C are diagrams showing changes before and after the insertion of a transfer instruction into a leaf node of a cyclic path that includes a plurality of longest paths.
Figure 17B:
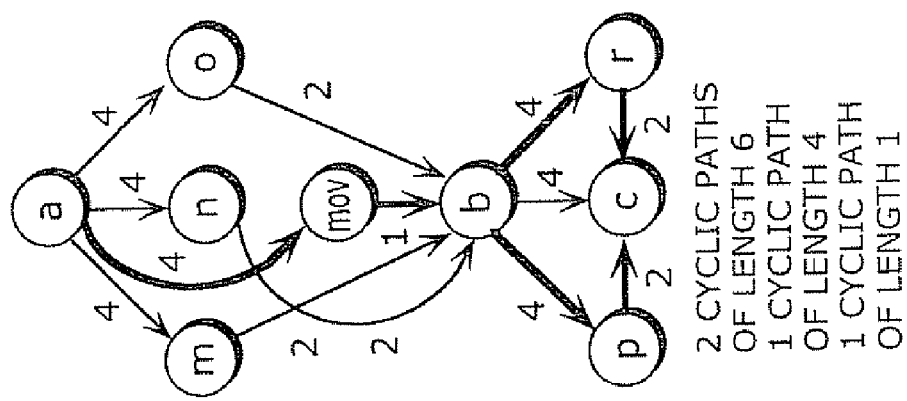
Figure 17A:
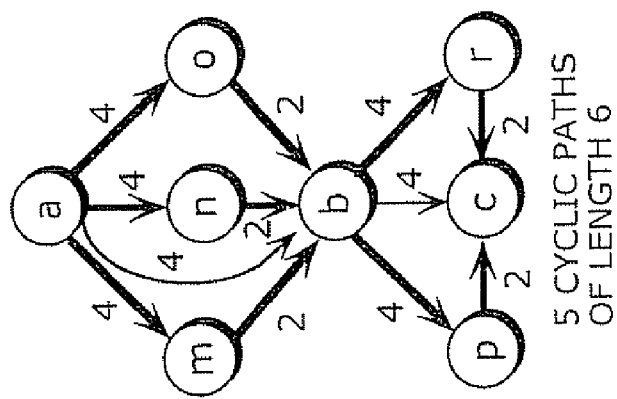

FIGS. 17A to 17C are diagrams showing changes before and after the insertion of a transfer instruction into a leaf node of the cyclic path that includes a plurality of longest paths. In these diagrams, the true dependence is indicated by an arrow in a solid line. Here, it should be noted that although not illustrated in these diagram, there is necessarily a loop-carried dependence opposite in direction to the true dependence indicated by the solid line.

FIG. 17A shows a cyclic path that includes 5 longest paths, with each path length being 6 cycles. In this diagram, these 5 longest paths are indicated specifically by arrows in thick solid lines. As shown, the loop-carried dependence between the instructions b and a also exists in 3 cyclic paths, which are: a path made up of instructions a, m, and b; a path made up of instructions a, n, and b; and a path made up of instructions a, o, and b. Moreover, the loop-carried dependence between the instructions c and b also exists in 2 cyclic paths, which are: a path made up of instructions b, p, and c; and a path made up of instructions b, r, and c.

FIG. 17B shows a cyclic path obtained after the instruction mov has been inserted into the leaf node b so that the loop-carried dependence cut is executed between the instructions b and a. In this diagram, the arrows in thick lines indicate the cyclic paths changed from the longest paths shown in FIG. 17A. More specifically, the 5 longest paths whose respective path lengths were 6 cycles are changed into, with a dependence distance of 1: 2 longest paths, each path length being 6 cycles; 1 cyclic path with a path length of 4 cycles; and 1 cyclic path with a path length of 1 cycle.

FIG. 17C shows a cyclic path obtained after the instruction mov has been inserted into the leaf node c so that the loop-carried dependence cut is executed between the instructions c and b. In this diagram, the arrows in thick lines indicate the cyclic paths changed from the longest paths shown in FIG. 17A. More specifically, the 5 longest paths whose respective path lengths were 6 cycles are changed into, with a dependence distance of 1: 3 longest paths, each path length being 6 cycles; 1 cyclic path with a path length of 4 cycles; and 1 cyclic path with a path length of 1 cycle.

As can be understood, the number of the longest paths is reduced more in the case of FIG. 17B than the case of FIG. 17C. That is, for the case where the transfer instruction is inserted into a leaf node, the number of cyclic paths with longer path lengths can be reduced by the loop-carried dependence cut performed by the insertion of the transfer instruction into the leaf node that has more, longer cyclic paths. Consequently, the instruction placement constraint imposed during software pipelining can be eased.

Figure 18A:
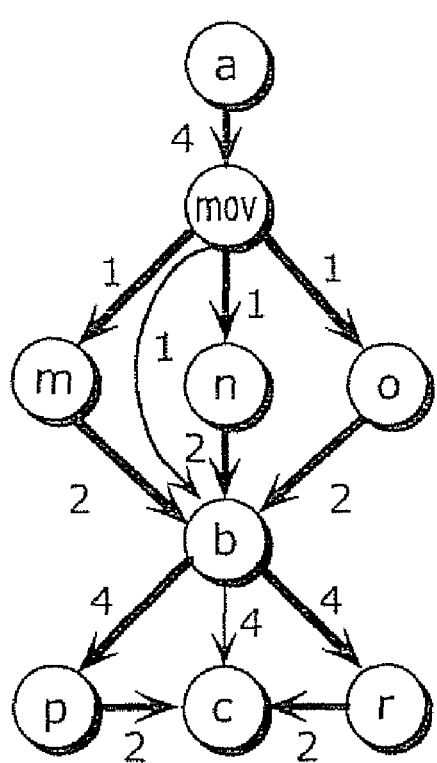
FIGS. 18A and 18B are diagrams showing changes before and after the insertion of a transfer instruction into a root node of a cyclic path that includes a plurality of longest paths.
Figure 18B:
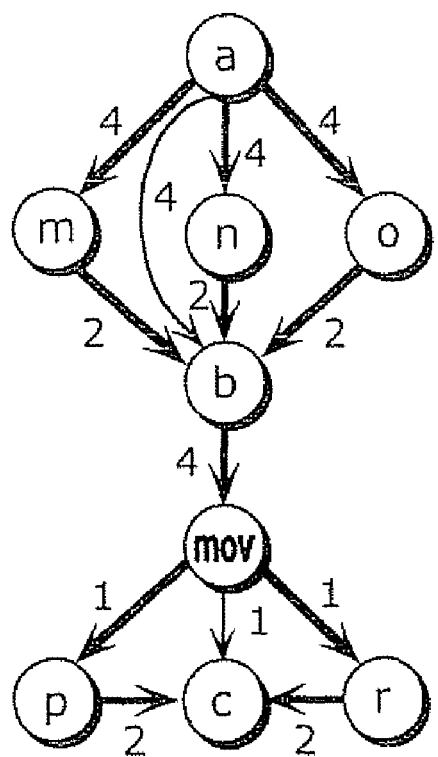

FIGS. 18A and 18B are diagrams showing changes before and after the insertion of a transfer instruction into a root node of the cyclic path that includes a plurality of longest paths. Note here that the arrows in these diagrams represent the same meanings as those in FIGS. 17A to 17C.

FIG. 18A shows a cycle path obtained after the instruction mov has been inserted into the root node a so that the loop-carried dependence cut is performed between the instructions b and a shown in FIG. 17A. Note here, in this case, that the same register causes both the true dependence between the instruction a and the instructions m, n, and o and the loop-carried dependence between the instruction b and a. As shown, the 5 longest paths whose respective path lengths were 6 cycles are changed into, with a dependence distance of 1: 2 longest paths, each path length being 6 cycles; 1 cyclic path with a path length of 4 cycles; and 3 cyclic paths, each path length being 3 cycles.

Meanwhile, FIG. 18B shows a cycle path obtained after the instruction mov has been inserted into the root node b so that the loop-carried dependence cut is performed between the instructions c and b shown in FIG. 17A. Note here, in this case, that the same register causes both the true dependence between the instruction b and the instructions p and r and the loop-carried dependence between the instruction c and b. As shown, the 5 longest paths whose respective path lengths were 6 cycles are changed into, with a dependence distance of 1: 3 longest paths, each path length being 6 cycles; 1 cyclic path with a path length of 4 cycles; and 2 cyclic paths, each path length being 3 cycles.

As can be understood, the number of the longest paths is reduced more in the case of FIG. 18A than the case of FIG. 18B. That is, for the case where the transfer instruction is inserted into a root node, the number of cyclic paths with longer path lengths can be reduced by the loop-carried dependence cut performed by the insertion of the transfer instruction into the root node that has more, longer cyclic paths. Consequently, the instruction placement constraint imposed during software pipelining can be eased.

[Cyclic Path Including a Plurality of Loop-Carried Dependences]

Figure 19C:
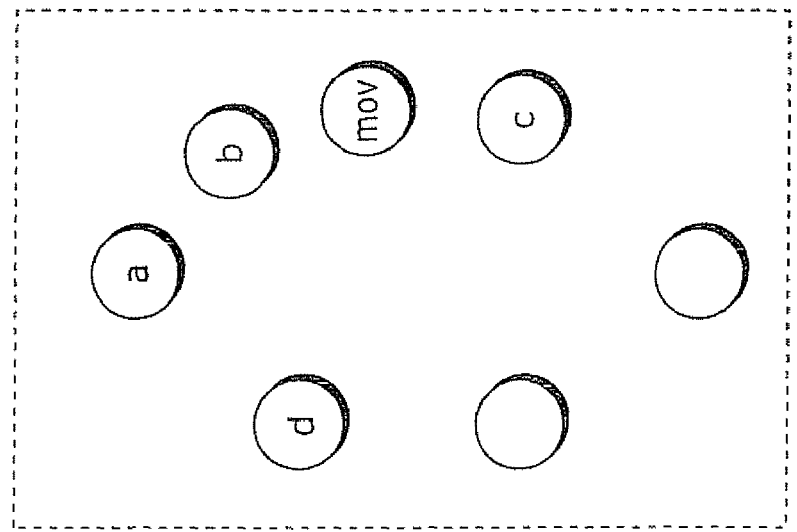
FIGS. 19A to 19C are diagrams showing changes before and after the insertion of a transfer instruction into a cyclic path that includes a plurality of loop-carried dependences.
Figure 19B:
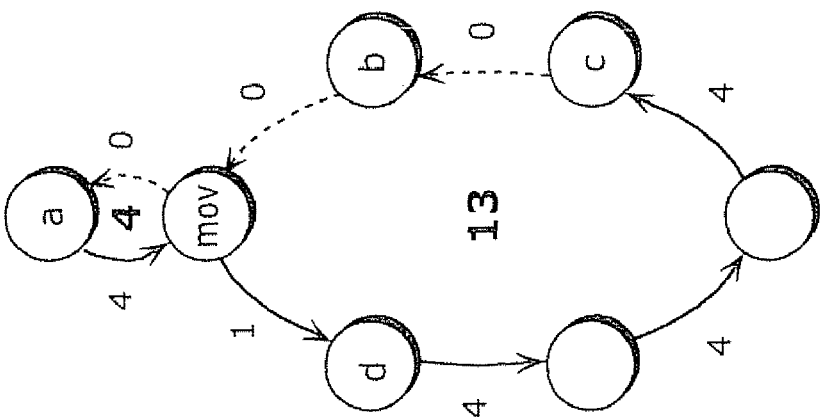
Figure 19A:
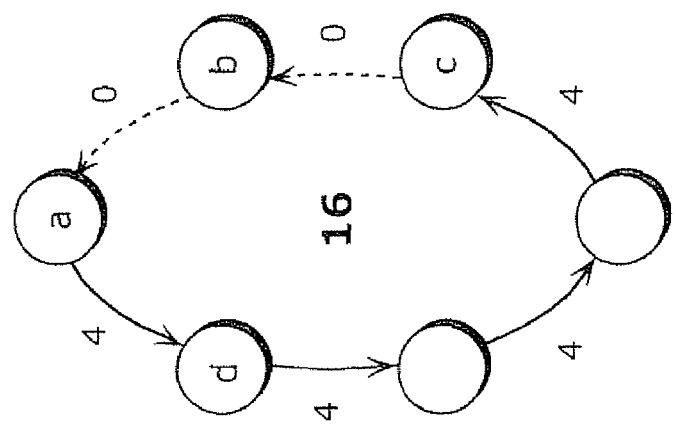

FIGS. 19A to 19C are diagrams showing changes before and after the insertion of a transfer instruction into a cyclic path that has a plurality of loop-carried dependences. In these diagrams, the true dependence is indicated by an arrow in a solid line whereas the loop-carried antidependence is indicated by an arrow in a short dashed line.

FIG. 19A shows a cyclic path that includes 2 loop-carried dependences, which exist respectively between the instructions c and b and between the instructions b and a. The path length of this cyclic path is 16 cycles as shown.

FIG. 19B shows a cycle path obtained after the instruction mov has been inserted into the root node a of the cyclic path shown in FIG. 19A. To be more specific, the cyclic path of 16 cycles with a dependence distance of 2 is divided into cyclic paths whose respective path lengths are 13 cycles and 4 cycles, with a dependence distance of 2. Note here, in this case, that the same register causes both the true dependence between the instructions a and d and the loop-carried dependence between the instruction b and a. In this way, the path length is shortened, thereby easing the instruction placement constraint imposed during software pipelining.

Meanwhile, FIG. 19C shows a cycle path obtained after the instruction mov has been inserted into the leaf node c of the cyclic path shown in FIG. 19A As shown, the cyclic path whose path length is 16 cycles with a dependence distance of 2 is eliminated. Accordingly, the instruction placement constraint imposed during software pipelining can be eased.

As described so far, according to the present invention, when a cyclic path includes at least one loop-carried antidependence, the path length can be shortened and the instruction placement constraint imposed during software pipelining can be eased, by the insertion of a transfer instruction into a leaf node or root node of the cyclic path. This allows software pipelining to be performed with enhanced speed and efficiency in the cases where the path length of the longest path or the resource constrained path length of the resource-constrained longest path can be shortened and the initiation interval of the loop process can also be shortened.

Although the compiler apparatus of the present invention has been described in the present embodiment, the present invention is not limited to this. For example, the above-mentioned loop-carried dependence cut may be performed more than once on the same loop, so that software pipelining can be executed with even more enhanced speed and efficiency.

Moreover, in the exclusion process performed on the cyclic path set in step S403 shown in FIG. 8, the instruction selection unit 212 may exclude a cyclic path in which the latency of the root node is equal to or shorter than the latency of the transfer instruction. By doing so, the cyclic path whose path length would be longer by the insertion of the transfer instruction can be excluded in advance. This allows an appropriate cyclic path to be selected with enhanced speed and efficiency.

Figure 20:
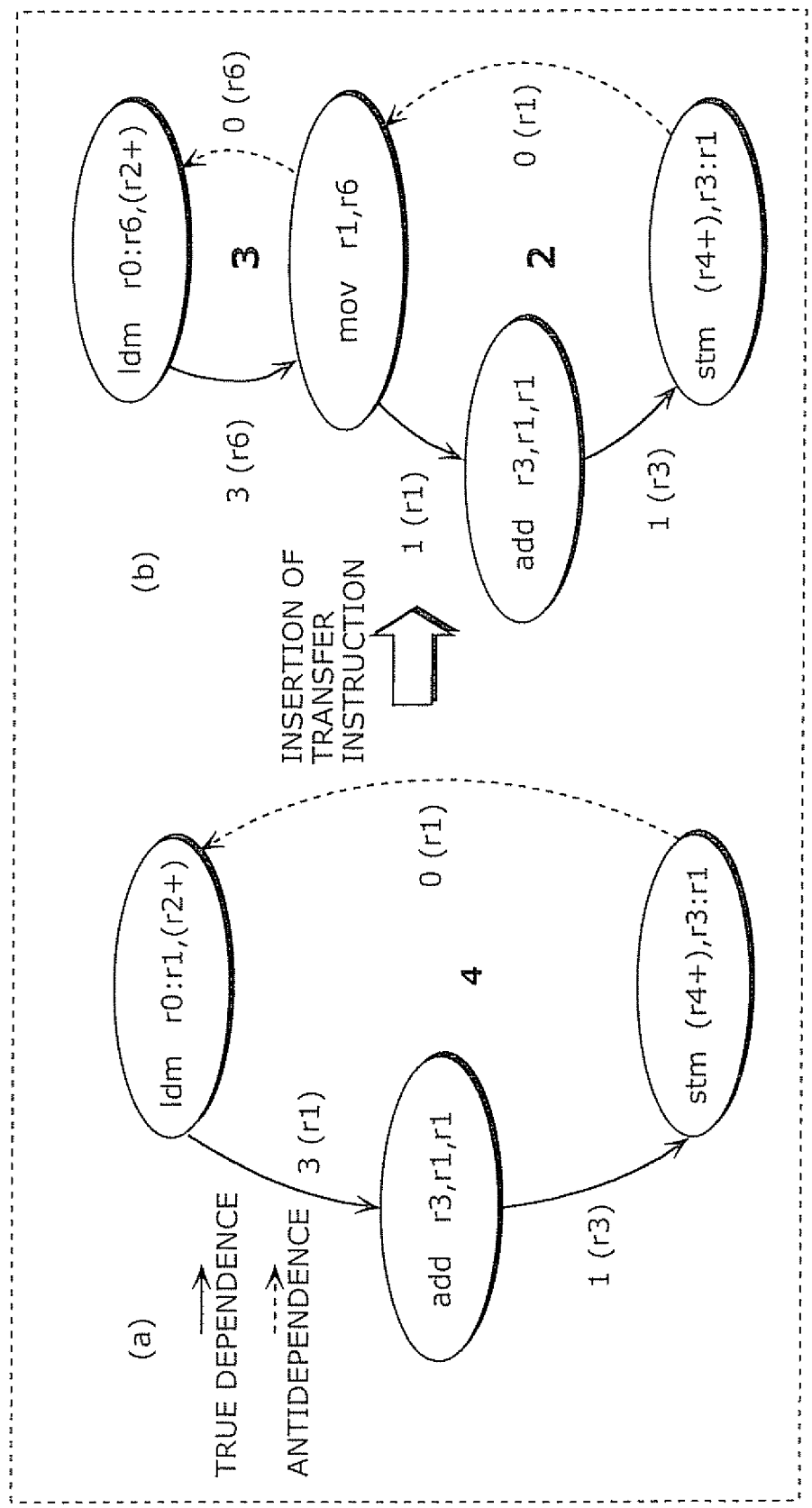
FIG. 20 is a diagram showing changes in a data dependence graph before and after the insertion of a transfer instruction into a cyclic path.

Furthermore, in the examples shown in FIGS. 5 to 7, the explanation was given as to the cases where the registers respectively causing the true dependence and causing the loop-carried antidependence for the leaf node or root node are different. However, these registers may be the same one register. FIG. 20 is a diagram showing changes in a data dependence graph before and after the insertion of a transfer instruction into a cyclic path.

FIG. 20 (a) shows a cyclic path that includes three instructions ldm, add, and stm. As shown in this diagram, the register as a parameter of the true dependence and the register as a parameter of the loop-carried antidependence in this cyclic path are the same, i.e., the register r1. FIG. 20 (b) shows a cyclic path obtained after the instruction mov has been inserted into the root node, that is, the instruction ldm, of the cyclic path shown in FIG. 20 (a). To be more specific, instead of the instruction ldm, an instruction "ldm r0: r6, (r2+)" is used. In this instruction, the register r1 which is the parameter used by the instruction ldm for the loop-carried dependence is replaced with an unused register r6. Also, a transfer instruction "mov r1, r6" is inserted, so that the value stored in the register r6 is stored into the register r1 which is the original parameter. By this insertion of the instruction mov into the root node, the cyclic path whose path length was 4 cycles is divided into 2 cyclic paths whose respective path lengths are 3 cycles and 2 cycles. In this case, there is a possibility of shortening the initiation interval to 3 cycles.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention can be applied to a compiler or the like whose target processor is capable of parallel processing.

What is claimed is:

1. A compiler apparatus comprising a processor for converting a source program into a machine language program for a processor device which is capable of parallel processing, the converting being performed by a computer, said compiler apparatus comprising:

a parser configured to parse the source program and then to convert the source program into an intermediate program which is described in an intermediate language;

an optimizer configured to optimize the intermediate program; and a converter configured to convert the optimized intermediate program into the machine language program, wherein, when there is a cyclic data dependence relation that starts with and ends with an instruction in a loop process, said optimizer executes software pipelining, by inserting a transfer instruction, which is used for transferring data between operands, into the loop process included in the intermediate program so that the data dependence relation is changed.

2. The compiler apparatus according to claim 1, wherein said optimizer comprises:

a cyclic path detector configured to create a data dependence graph representing dependence relations among instructions present in the intermediate program, and to detect a cyclic path which is a closed path that starts with and ends with an instruction, the cyclic path tracing data dependences of the instructions in the data dependence graph;

an inserter configured to insert the transfer instruction whose operands include a parameter of a loop-carried dependence included in the detected cyclic path; and a software pipeliner configured to execute software pipelining on the intermediate program into which the transfer instruction has been inserted.

3. The compiler apparatus according to claim 2,
wherein said inserter comprises:
an instruction selector configured to select an instruction on which a different instruction is true dependent and which is loop-carried antidependent, in the detected cyclic path;
an instruction replacer configured to replace a first register that is used in the selected instruction with a second register; and
a transfer instruction inserter configured to insert the transfer instruction for transferring a value stored in the first register to the second register.

4. The compiler apparatus according to claim 3,
wherein said cyclic path detector is configured to detect at least one cyclic path which has a longest total latency of data dependences, and
said instruction selector is configured to, when a plurality of cyclic paths which each have the longest total latency are present, select an instruction, from among instructions which are loop-carried dependent in the cyclic paths or on each of which a different instruction is loop-carried dependent in the cyclic paths, that is loop-carried dependent in a largest number of cyclic paths or that a different instruction is loop-carried dependent on in a largest number of cyclic paths.

5. The compiler apparatus according to claim 2,
wherein said inserter comprises:
an instruction selector configured to select an instruction which is true dependent and on which a different instruction is loop-carried antidependent, in the detected cyclic path;
an instruction replacer configured to replace a first register that is defined by the selected instruction with a second register; and
a transfer instruction inserter configured to insert the transfer instruction for transferring a value stored in the second register to the first register.

6. The compiler apparatus according to claim 2,
wherein said cyclic path detector is configured to detect a cyclic path which has a longest path length, the path length representing a total latency of data dependences in the cyclic path.

7. The compiler apparatus according to claim 6,
wherein said cyclic path detector is configured to detect a resource constrained cyclic path which has a longest resource constrained path length.

8. The compiler apparatus according to claim 2,
wherein said cyclic path detector is configured to detect a cyclic path other than a cyclic path which is made up of two instructions and in which a same one register causes both a true dependence and a loop-carried antidependence.

9. The compiler apparatus according to claim 2,
wherein said cyclic path detector is configured to detect a cyclic path in which a latency incurred by an instruction that is true dependent and that a different instruction is loop-carried antidependent on is longer than a latency incurred by the transfer instruction.

10. A compiling method for converting, by a computer, a source program into a machine language program for a processor which is capable of parallel processing, the compiling method comprising:
parsing the source program and then converting the source program into an intermediate program which is described in an intermediate language;
optimizing the intermediate program; and
converting the optimized intermediate program into the machine language program,
wherein, when there is a cyclic data dependence relation that starts with and ends with an instruction in a loop process, in the optimizing of the intermediate program, software pipelining is executed, by an insertion of a transfer instruction, which is used for transferring data between operands, into the loop process included in the intermediate program so that the data dependence relation is changed.

11. The compiling method according to claim 10,
wherein the optimizing comprises:
creating a data dependence graph representing dependence relations among instructions present in the intermediate program, and detecting a cyclic path which is a closed path that starts with and ends with an instruction, the cyclic path tracing data dependences of the instructions in the data dependence graph;
inserting the transfer instruction whose operands include a parameter of a loop-carried dependence included in the detected cyclic path; and
executing software pipelining on the intermediate program into which the transfer instruction has been inserted.

12. The compiling method according to claim 11,
wherein the inserting comprises:
selecting an instruction on which a different instruction is true dependent and which is loop-carried antidependent, in the detected cyclic path;
replacing a first register that is used in the selected instruction with a second register; and
inserting the transfer instruction for transferring a value stored in the first register to the second register.

13. The compiling method according to claim 12,
wherein the creating detects at least one cyclic path which has a longest total latency of data dependences, and
the selecting is configured to, when a plurality of cyclic paths which each have the longest total latency are present, select an instruction, from among instructions which are loop-carried dependent in the cyclic paths or on each of which a different instruction is loop-carried dependent in the cyclic paths, that is loop-carried dependent in a largest number of cyclic paths or that a different instruction is loop-carried dependent on in a largest number of cyclic paths.

14. The compiler apparatus according to claim 11,
wherein the inserting comprises:
selecting an instruction which is true dependent and on which a different instruction is loop-carried antidependent, in the detected cyclic path;
replacing a first register that is defined by the selected instruction with a second register; and
inserting the transfer instruction for transferring a value stored in the second register to the first register.

15. The compiler apparatus according to claim 11,
wherein the creating is configured to detect a cyclic path which has a longest path length, the path length representing a total latency of data dependences in the cyclic path.

16. The compiler apparatus according to claim 11,
wherein the creating is configured to detect a cyclic path other than a cyclic path which is made up of two instructions and in which a same one register causes both a true dependence and a loop-carried antidependence.

17. The compiler apparatus according to claim 11,
wherein the creating is configured to detect a cyclic path in which a latency incurred by an instruction that is true dependent and that a different instruction is loop-carried antidependent on is longer than a latency incurred by the transfer instruction.

18. A compiler comprising a processor which causes a computer to convert a source program into a machine language program for a processor device that is capable of parallel processing, said compiler comprising an execution apparatus and causing said computer to execute:

parsing the source program and then converting the source program into an intermediate program which is described in an intermediate language;

optimizing the intermediate program; and converting the optimized intermediate program into the machine language program, wherein, when there is a cyclic data dependence relation that starts with and ends with an instruction in a loop process, in said optimizing of the intermediate program, software pipelining is executed, by an insertion of a transfer instruction, which is used for transferring data between operands, into the loop process included in the intermediate program so that the data dependence relation is changed.

19. A non-transitory computer-readable recording medium which records a compiler for causing a computer to convert a source program into a machine language program for a processor that is capable of parallel processing, said compiler causing said computer to execute:

parsing the source program and then converting the source program into an intermediate program which is described in an intermediate language;

optimizing the intermediate program; and converting the optimized intermediate program into the machine language program, wherein, when there is a cyclic data dependence relation that starts with and ends with an instruction in a loop process, in the optimizing of the intermediate program, software pipelining is executed, by an insertion of a transfer instruction, which is used for transferring data between operands, into the loop process included in the intermediate program so that the data dependence relation is changed.

20. A program for a processor which is capable of parallel processing, the program being recorded on a non-transitory, computer readable recording medium, said program causing said processor to execute:

an instruction for executing iterations of a loop process in parallel; and a transfer instruction for transferring data between operands used in an instruction making up a closed path which starts with and ends with a same instruction, the closed path tracing data dependences of the instruction included in a data dependence graph created with respect to the loop process, when there is a cyclic data dependence relation that starts with and ends with an instruction in the loop process.

* * * * *